United States Patent
Nagarajan et al.

(10) Patent No.: US 11,255,665 B2
(45) Date of Patent: Feb. 22, 2022

(54) SYSTEMS AND METHODS FOR DETERMINING WHERE TO PLACE ATMOSPHERIC SENSORS USED TO ESTIMATE AN ALTITUDE OF A MOBILE DEVICE IN AN ENVIRONMENT

(71) Applicant: NextNav, LLC, Sunnyvale, CA (US)

(72) Inventors: Badrinath Nagarajan, Cupertino, CA (US); Guiyuan Han, San Jose, CA (US); Michael Dormody, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 331 days.

(21) Appl. No.: 16/380,636

(22) Filed: Apr. 10, 2019

(65) Prior Publication Data

US 2019/0368870 A1  Dec. 5, 2019

Related U.S. Application Data

(60) Provisional application No. 62/680,797, filed on Jun. 5, 2018.

(51) Int. Cl.
*G01C 5/06* (2006.01)
*G01C 5/00* (2006.01)
*G01C 21/20* (2006.01)

(52) U.S. Cl.
CPC ............ *G01C 5/00* (2013.01); *G01C 5/06* (2013.01); *G01C 21/206* (2013.01)

(58) Field of Classification Search
CPC ........... G01C 5/00; G01C 21/206; G01C 5/06
See application file for complete search history.

(56) References Cited

U.S. PATENT DOCUMENTS

| | | | |
|---|---|---|---|
| 8,130,141 B2 | 3/2012 | Pattabiraman et al. | |
| 9,057,606 B2 | 6/2015 | Wolf et al. | |
| 9,980,246 B2 | 5/2018 | Pattabiraman et al. | |
| 10,694,325 B2* | 6/2020 | Robertson | G01S 11/06 |
| 2015/0330779 A1* | 11/2015 | Moeglein | G01C 5/06 |
| | | | 342/462 |
| 2017/0280301 A1 | 9/2017 | Chang et al. | |

(Continued)

OTHER PUBLICATIONS

Hao Xia,, Xiaogang Wang , Yanyou Qiao , Jun Jian, and Yuanfei Chang, "Using Multiple Barometers to Detect the Floor Location of Smart Phones with Built-in Barometric Sensors for Indoor Positioning ", Apr. 2015Sensors 15(4):7857-7877.*

(Continued)

*Primary Examiner* — Huan H Tran
(74) *Attorney, Agent, or Firm* — MLO, a professional corp.

(57) ABSTRACT

Determining where to place atmospheric sensors that provide measurements of pressure used to estimate an altitude of a mobile device in an environment. Generally, systems and methods determine where atmospheric sensors can be placed relative to each other in order to achieve a required level of accuracy when an altitude of a mobile device is estimated using pressure measurements from the atmospheric sensors in the network. Particular systems and methods determine a maximum distance for separating adjacent atmospheric sensors, or otherwise determine where to place atmospheric sensors relative to each other based on expected pressure distribution of an environment.

12 Claims, 26 Drawing Sheets

(56) References Cited

U.S. PATENT DOCUMENTS

2018/0206078 A1* 7/2018 Venkatraman ........ H04W 4/025

OTHER PUBLICATIONS

Min Yu, Feng Xue, Chao Ruan & Hang Guo "Floor positioning method indoors with smartphone's barometer" https://doi.org/10.1080/10095020.2019.1631573GEO-SPATIAL INFORMATION SCIENCE.*

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Ghaderi et al., "Deep Forecast: Deep Learning-based Spatio-Temporal Forecasting", ICML 2017 Time Series Workshop, Sydney, Australia, 2017, 6 pages.

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

* cited by examiner

Determine a reference pressure P# for each point in a grid G of points that are uniformly distributed by a distance D Determine pressure values p#_n for the nth group of points (n=1)

One embodiment for determining a pressure value for a point uses an average of reference pressures for points that are the $n$th distance $n*D$ from the point ($n=1$) (e.g., p15_n = average of P2, P14, P16 and P28)

For each point in the nth group of points, determine a difference $d\#\_n$ between the pressure value $p\#\_n$ for that point and the reference pressure $P\#$ for that point (n=1)

Determine if the largest determined difference exceeds a threshold amount of pressure (e.g., d43_n is the largest difference of 12 Pa, which does not exceed a threshold amount of pressure 30Pa) (n=1)

Determine pressure values p#_n for the nth group of points (n=2)

One embodiment for determining a pressure value for a point uses an average of reference pressures for points that are an $n$th distance $n*D$ from the point ($n=2$) (e.g., p15_n = average of P17 and P41)

For each point in the *n*th group of points, determine a difference *d#_n* between the pressure value *p#_n* for that point and the reference pressure *P#* for that point
(*n*=2)

Determine if the largest determined difference exceeds the threshold amount of pressure (e.g., d73_n is the largest difference of 32 Pa, which exceeds the threshold amount of pressure 30Pa, so the maximum distance is the nth distance n*D) (n=2)

SYSTEMS AND METHODS FOR DETERMINING WHERE TO PLACE ATMOSPHERIC SENSORS USED TO ESTIMATE AN ALTITUDE OF A MOBILE DEVICE IN AN ENVIRONMENT

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

Using the above equations to determine an estimated altitude of a mobile device in an environment requires one or more reference-level pressures that accurately reflect reference-level pressure near the location of the mobile device. Different environments will typically have different weather pressure patterns created by terrain, bodies of water or other environmental features that affect whether a reference-level pressure accurately reflects reference-level pressure near the location of the mobile device. When networks of atmospheric sensors are designed, there may be a desire to use the same network design of atmospheric sensors in every environment. However, using the same network design in every environment can unnecessarily increase cost in terms of installation and maintenance since using the same network design does not consider weather pressure patterns in each environment that may allow for larger and/or variable spacing between atmospheric sensors, or may not consider certain areas of an environment that requires closer spacing of atmospheric sensors.

Different systems and methods that address the above issues by determining how to optimally position atmospheric sensors relative to each other depending on the characteristics of an environment are described in the disclosure that follows. Use of these systems and methods result in a network design that minimizes cost compared to other approaches while still providing estimated altitudes of mobile devices that are within a tolerated amount of error.

DETAILED DESCRIPTION

Systems and methods for determining where to place atmospheric sensors that provide measurements of pressure used to estimate an altitude of a mobile device in an environment are described below.

Figure 1:
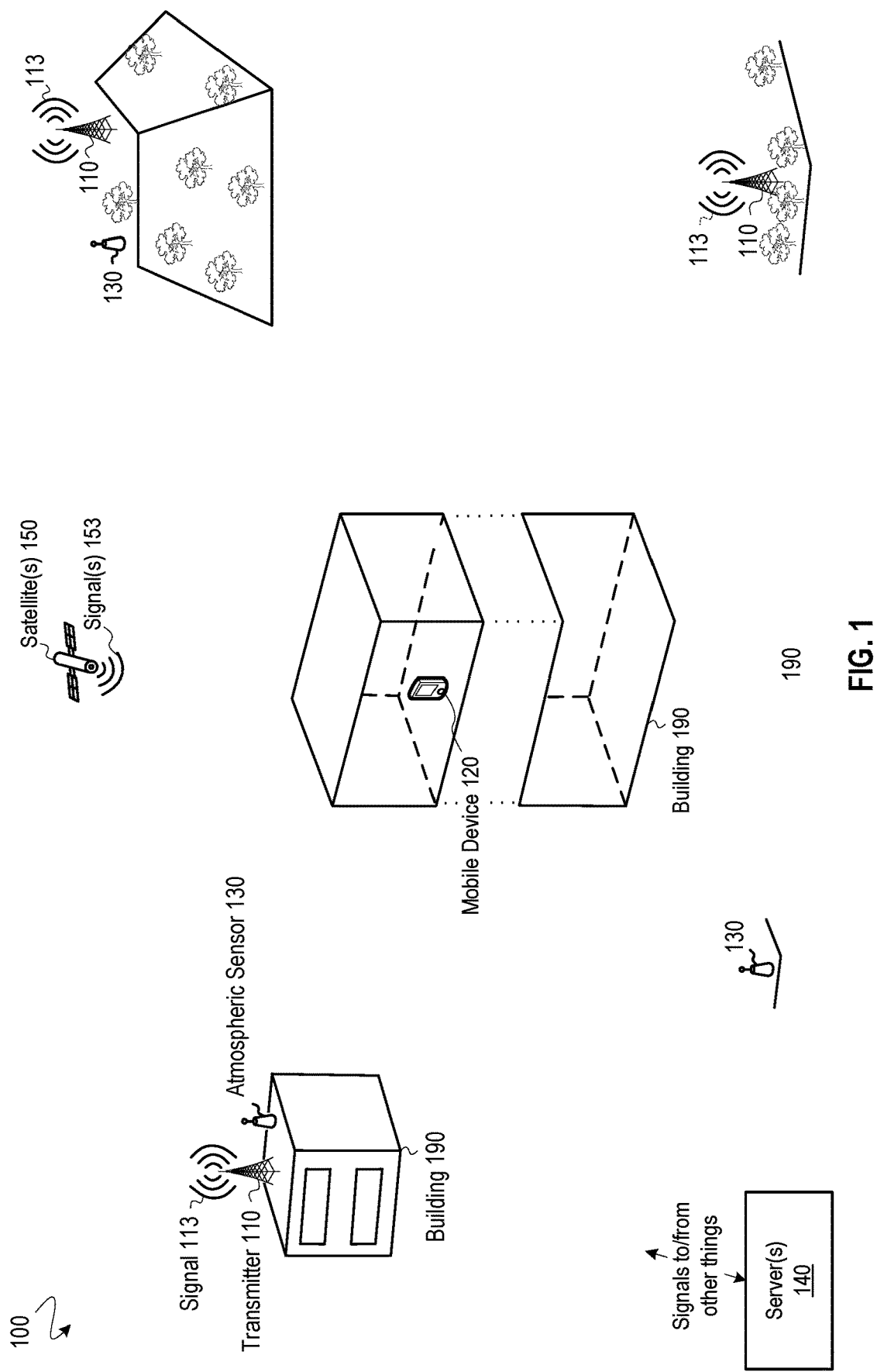
FIG. 1 depicts an operational environment for determining a maximum distance between two adjacent atmospheric sensors in an environment.

Attention is initially drawn to an operational environment 100 illustrated in FIG. 1, which includes a network of terrestrial transmitters 110 at different altitudes, a mobile device 120 at an unknown altitude, a server 140, a network of satellites 150. The mobile device 120 may take different forms, including a mobile phone or other wireless communication device, a portable computer, a navigation device, a tracking device, a receiver, or another suitable device that can receive the signals 113 and/or 153, and then use the received signals to determine an estimated position of the mobile device 120 in up to three dimensions (e.g., latitude, longitude, altitude) as is known in the art. Alternatively, the server 140 can determine the estimated position using information derived from the signals by the mobile device 120 as is known.

Unfortunately, estimated altitudes using the positioning signals 113 and/or 153 often lack the accuracy needed for floor-level resolution (e.g., where the estimate altitude is within 3 meters from true altitude). In order to generate an estimated altitude to within floor-level resolution, a reference-level pressure is estimated based on a measurement of pressure from one of the atmospheric sensors 130, and the reference-level pressure is used along with a pressure measurement from a pressure sensor of the mobile device 120 to compute an estimated altitude of the mobile device 120 using previously-described Equations 1 and 2 from the Background section.

The accuracy of each estimated altitude for each location of the mobile device 120 will depend on any difference in pressure between the estimated reference-level pressure for the atmospheric sensors 130 and a reference-level pressure below or above the true location of the mobile device 120. For example, each 10 Pa of difference in pressure usually equates to an altitude error of 1 meter. For a tolerated altitude error of 3 meters, the difference between a reference-level pressure that was estimated using a measurement of pressure from an atmospheric sensor 130 and a reference-level pressure below or above the true location of the mobile device 120 cannot exceed a threshold amount of pressure difference equal to 30 Pa. Thus, the network of atmospheric sensors 130 in the environment 100 can be designed such that spacing among the atmospheric sensors 130 provides at least one estimated reference-level pressure that is within the threshold amount of pressure difference from a reference-level pressure below or above at any possible location of the mobile device 120 in the environment 100.

Detail about different approaches for determining where to place atmospheric sensors that provide measurements of pressure used to estimate an altitude of a mobile device in an environment is provided in the following sections. A first set of approaches determine a maximum distance available for separating adjacent atmospheric sensors that produce measurements of pressure for use in estimating an altitude of a mobile device. A second set of approaches determine where atmospheric sensors can be placed relative to other atmospheric sensors in an environment without the constraint of a maximum distance. Use of the embodiments shown in the figures and described herein advantageously optimizes placement of atmospheric sensors to reduce installation and maintenance cost, and/or provides customized placement of atmospheric sensors based on characteristics of an environment, where such atmospheric sensors provide atmospheric measurements needed to produce an estimated altitude of a mobile device that is accurate to within floor-level resolution or other levels of accuracy.

Figure 2A:
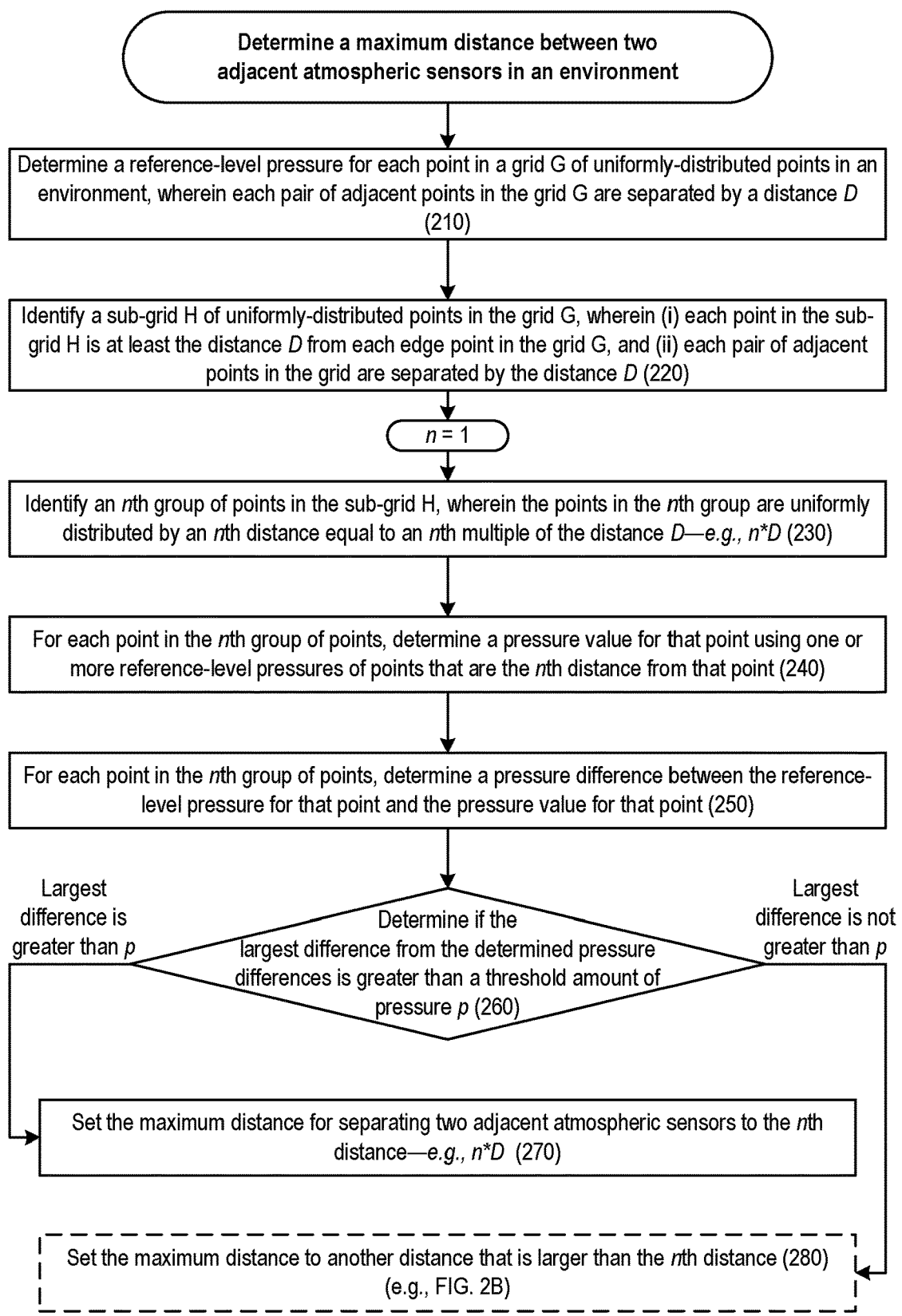
FIG. 2A depicts a process for determining a maximum distance between two adjacent atmospheric sensors in an environment.

Determining a Maximum Distance Between any Two Adjacent Atmospheric Sensors in an Environment One process for determining a maximum distance between any two adjacent atmospheric sensors in an environment is shown in FIG. 2A and described below. The process of FIG. 2A seeks to determine how far a mobile device can move away from an atmospheric sensor that produces a reference-level pressure before the error in an altitude estimate for the mobile device that uses the reference-level pressure exceeds a tolerated level (e.g., >1, 2 or 3 meters in error, which corresponds to >10, 20 or 30 Pa in pressure difference between (i) a pressure at an altitude the atmospheric sensor and the same altitude above or below the mobile device, or (ii) a reference-level pressure estimated using a pressure measurement from the atmospheric sensor and a reference-level pressure above or below the mobile device).

Initially, during step 210, a reference-level pressure is determined for each point in a grid G of uniformly-distributed points in an environment, where each point represents a location in the environment, and where each pair of adjacent points in the grid are separated by a distance D. The distance D may be a predefined distance such as a resolution of an available gridded data set from the NOAA (e.g., 3 kilometers). By way of example, "adjacent" points include points that neighbor each other (e.g., are next to each other along grid lines). The reference-level pressures for particular points can be determined using different approaches, including (i) identifying the reference-level pressure for a point from a source of reference-level pressures (e.g., an available data source like a NOAA weather map), (ii) determining each reference-level pressure by converting a measured pressure from each point to a reference-level pressure, or (iii) determining each reference-level pressure from a spatial distribution of reference-level pressures that was determined using measurements of pressure throughout the environment.

A sub-grid H of uniformly-distributed points in the grid G are identified during step 220. Each point in the sub-grid H is at least the distance D from each edge point in the grid G. Each pair of adjacent points in the grid are separated by at least the distance D. In a preferred embodiment, each edge point in the sub-grid H is the distance D from at least one each edge point in the grid G, and each pair of adjacent points in the grid are separated by exactly the distance D.

During a first iteration of step 230 (i.e., n=1), an nth group of points are identified in the sub-grid H such that the points in the nth group are uniformly distributed by an nth distance equal to an nth multiple of the distance D—e.g., n*D.

For each point in the nth group of points, a pressure value for that point is determined using one or more reference-level pressures of points that are the nth distance (e.g., n*D) from that point during step 240. In a first embodiment of step 240, the pressure value is determined using a mathematical combination of two or more reference-level pressures (e.g., the pressure value is an average of reference-level pressures for any combination of two, three or four points that are the nth distance from the point). In a second embodiment of step 240, the pressure value is determined using bilinear interpolation of all reference-level pressures for all points that are separated from the point by the nth distance. In a third embodiment of step 240, the pressure value is determined to be any reference-level pressure of any point that is the nth distance from the point. In a fourth embodiment of step 240, the pressure value is determined to be a first reference-level pressure of a point located the nth distance from the point that differs most from a reference-level pressure of the point as compared to other reference-level pressures of points that are located the nth distance from the point. In an alternative embodiment of step 240, the pressure value is determined as the reference-level pressure of the closet point in the nth group of points to the point, or an average of reference-level pressures of closet points in the nth group of points to the point.

For each point in the nth group of points, a pressure difference between the reference-level pressure for that point and the pressure value for that point is determined during step 250, and the largest computed pressure difference d from among the determined pressure differences is identified.

Next, a determination is made as to whether the largest difference d is greater than a threshold amount of pressure p during step 260. One example of the threshold amount of pressure is a pressure value corresponding to a predetermined amount of tolerated altitude error when computing an altitude of mobile device residing in the environment (e.g., where 1 meter of tolerated error typically corresponds to a 10 Pa threshold amount of tolerated pressure difference between reference-level pressures for the same reference-level altitude).

When the largest difference d is determined to be greater than the threshold amount of pressure, a maximum distance for separating two adjacent atmospheric sensors is set to the nth distance (e.g., n*D) during step 270.

When the largest difference d is determined to not be greater than the threshold amount of pressure, the maximum distance is set to another distance that is larger than the nth distance during step 280. In one embodiment of step 280, setting the maximum distance to another distance that is larger than the nth distance uses the process shown in FIG. 2B.

Figure 2B:
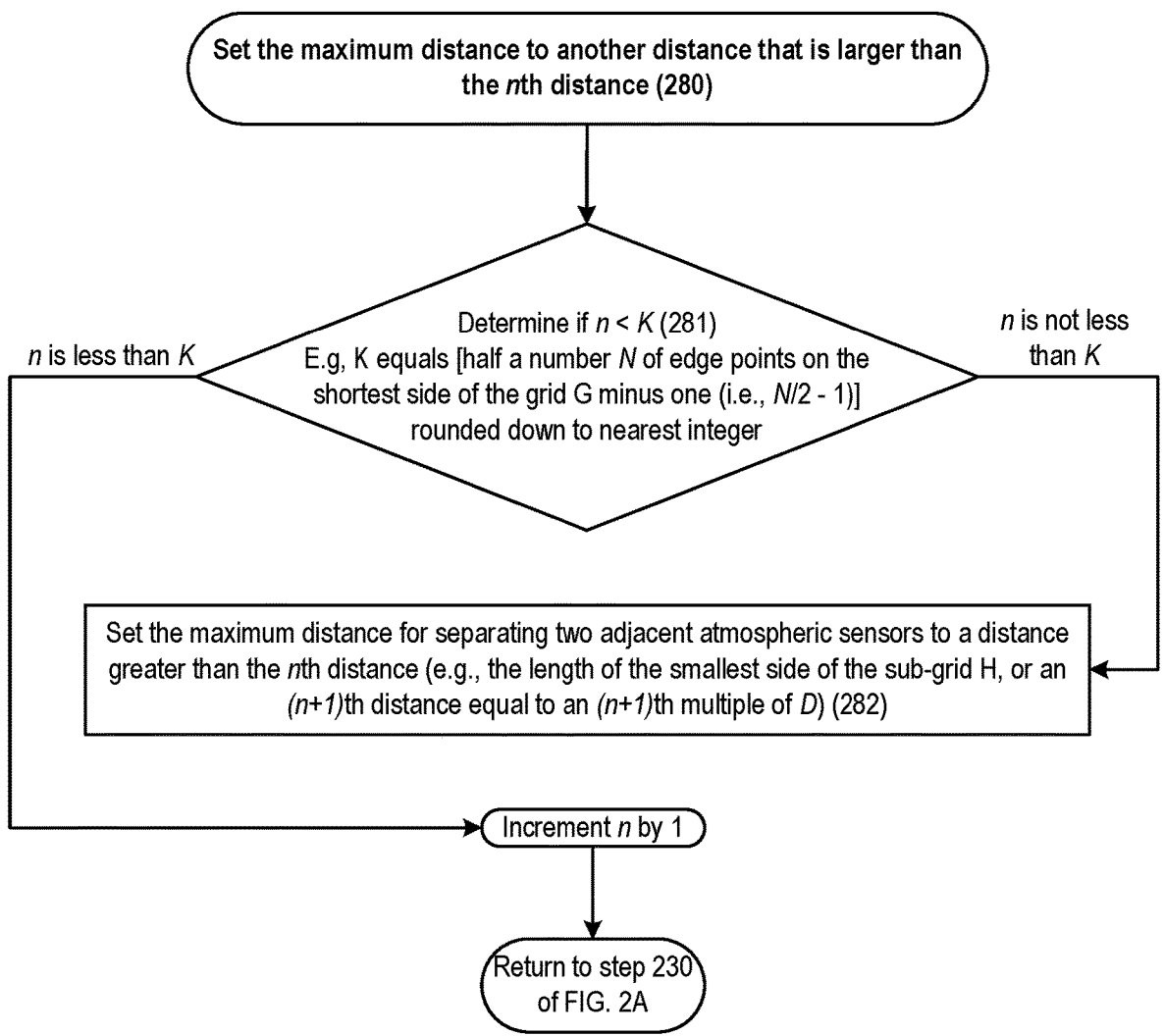
FIG. 2B depicts one embodiment for determining a maximum distance between any two adjacent atmospheric sensors in an environment using the process of FIG. 2A.

As shown in FIG. 2B, during sub-step 281 a determination is made as to whether the number of groups of points that have been identified (i.e., the value of n) is less than a threshold number K, where K is based on the size of the grid G. In one embodiment, K is determined by computing a first number that is equal to half a number N of edge points on the shortest side of the grid G minus one—i.e., computing N/2−1—and then rounding down the first number to the nearest integer (if the first number is not a whole number), and then setting K to the end result.

If the number of the groups (i.e., the value of n) is less than the threshold number K, an additional group of points is determined (i.e., n is incremented by 1, and the process returns to step 230 of FIG. 2A). If the number of the groups (i.e., the value of n) is not less than the threshold number K, the maximum distance for separating two adjacent atmospheric sensors is set to a distance greater than the nth distance during step 280. Such a distance may take different forms, including (i) the length of the smallest side of the sub-grid H, (ii) an (n+1)th distance equal to an (n+1)th multiple of D, or (iii) another predefined distance.

In one embodiment, the processes of FIG. 2A and FIG. 2B can be performed multiple times, but for different groups of points when n is equal to or greater than two, and the results of all performances can be used to choose the maximum distance that is actually used—e.g., each maximum distance determined for each performance can be averaged, and the averaged value can be set to the maximum distance that is actually used; e.g., each maximum distance determined for each performance can be compared, and the smallest of the distances can be set to the maximum distance that is actually used. By way of example, processes of FIG. 2A and FIG. 2B may be performed by one or more machines that include: processor(s) or other computing device(s) (e.g., a personal computer, server and/or other) for performing (e.g., that perform, or are configured, adapted or operable to perform) each step, and data source(s) at which any data identified in the processes is stored for later access during the processes.

By way of example, FIG. 3A through FIG. 3M illustrate one embodiment of the process of FIG. 2A.

Figure 3A:
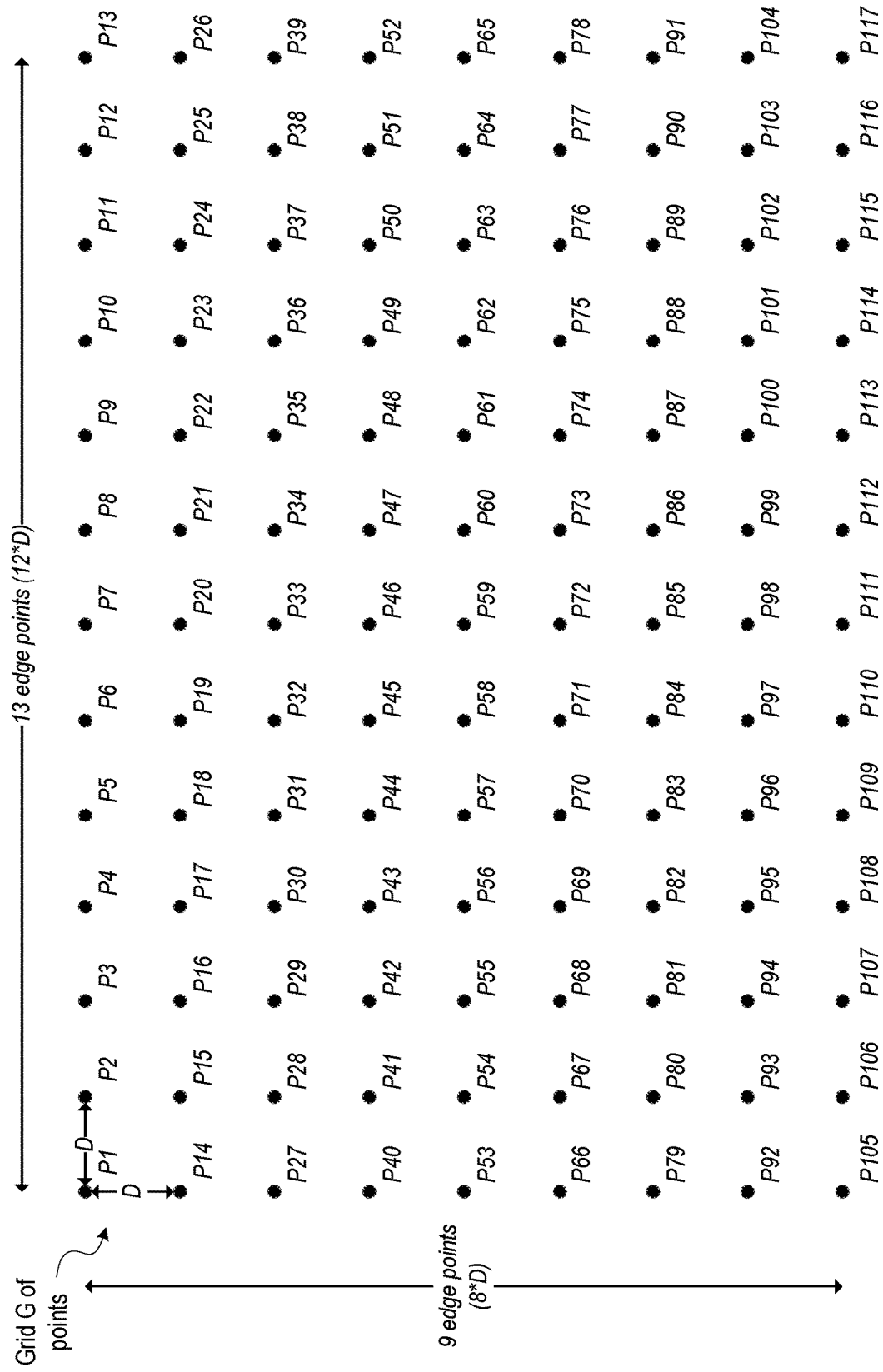
FIG. 3A through FIG. 3M illustrate one implementation of a process for determining a maximum distance between any two adjacent atmospheric sensors in an environment using the process of FIG. 2A.

An illustration of step 210 is shown in FIG. 3A, where reference-level pressures "P #" are provided for different locations that are uniformly-distributed by a distance D in a grid G. Edge points include the points on the border of the grid (e.g., the points corresponding to reference-level pressures P1-P14, P26-P27, P39-P40, P52-P53, P65-P66, P78-P79, P91-P92, and P104-P117).

Figure 3B:
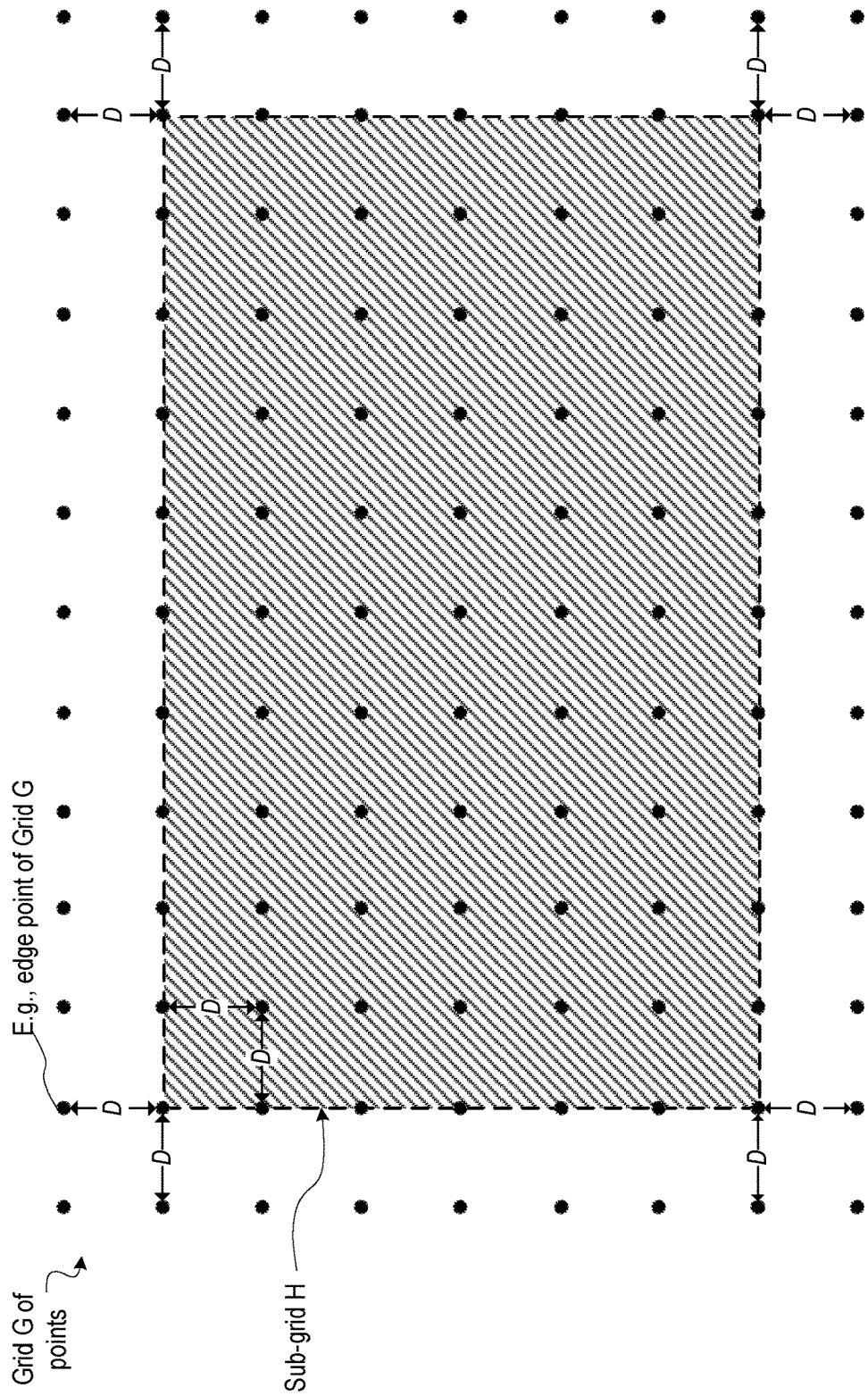

An illustration of step 220 is shown in FIG. 3B, which shows a sub-grid H of uniformly-distributed points (e.g., see the shaded box) identified from the grid G. Each point in the sub-grid H is at least the distance D from each edge point in the grid G. Each pair of adjacent points in the sub-grid H are separated by the distance D.

Figure 3C:
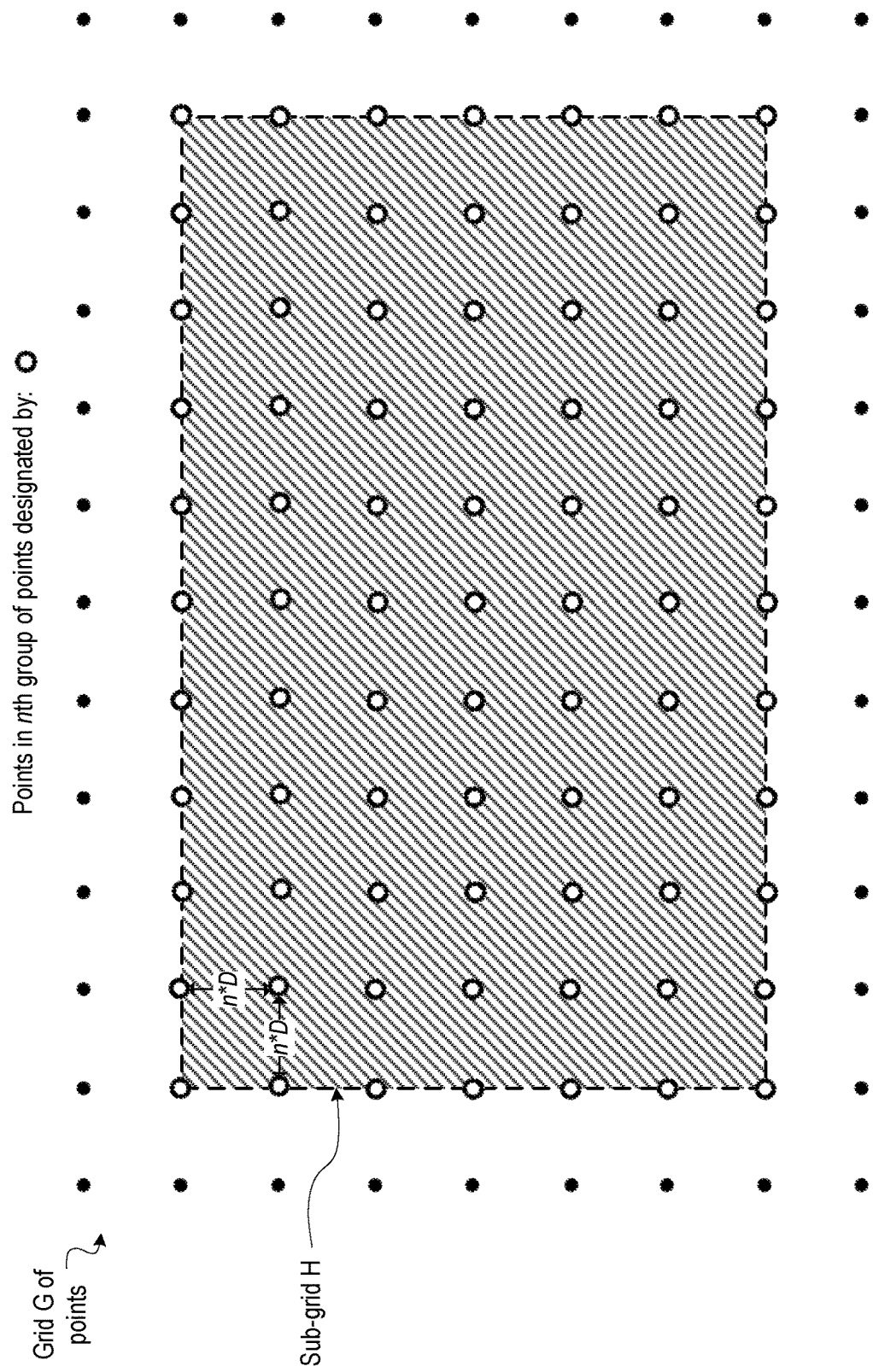

An illustration of a first iteration of step 230 is shown in FIG. 3C, which shows a first group of points designed by rings that are uniformly distributed by a first distance 1*D.

Figure 3D:
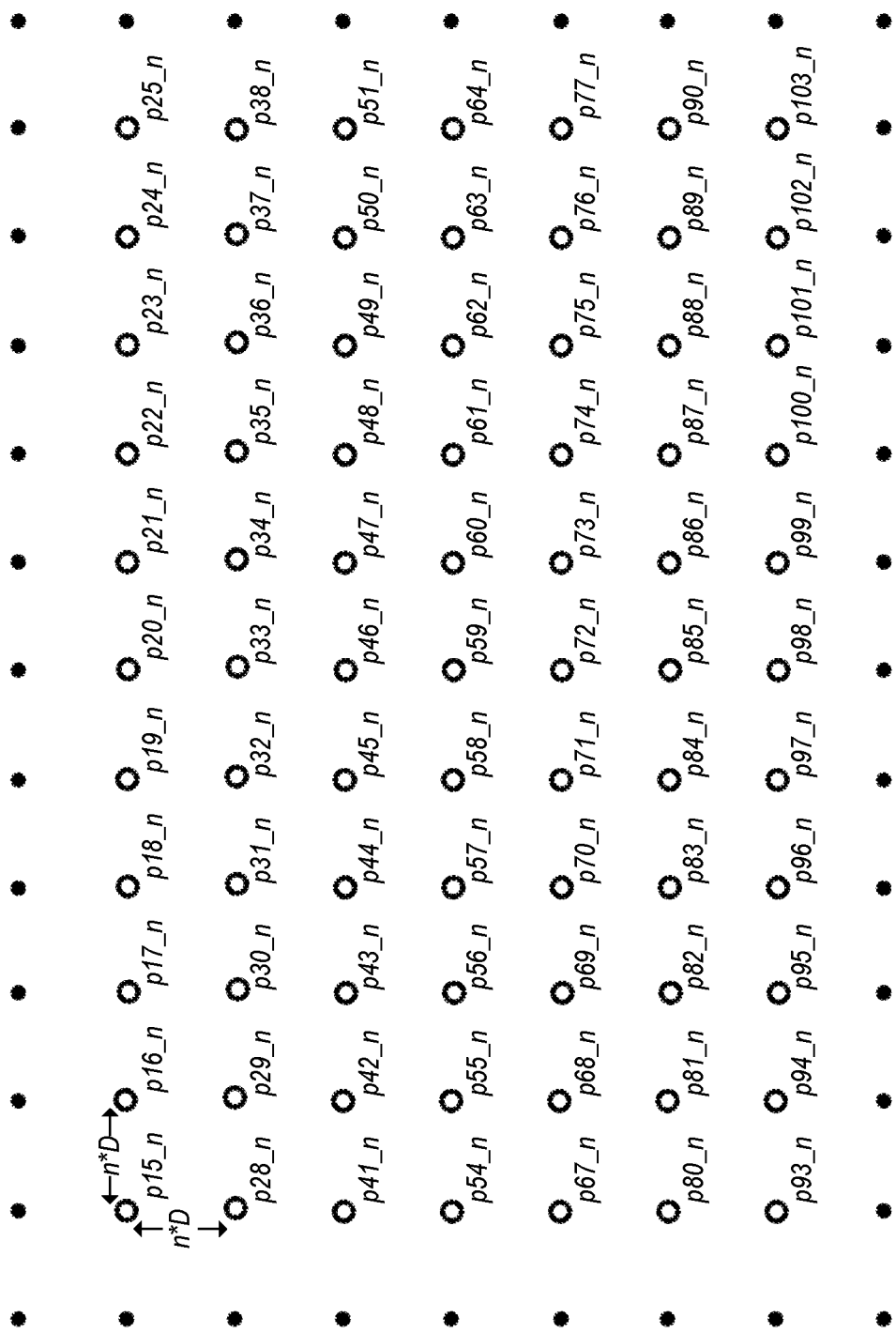
Figure 3E:
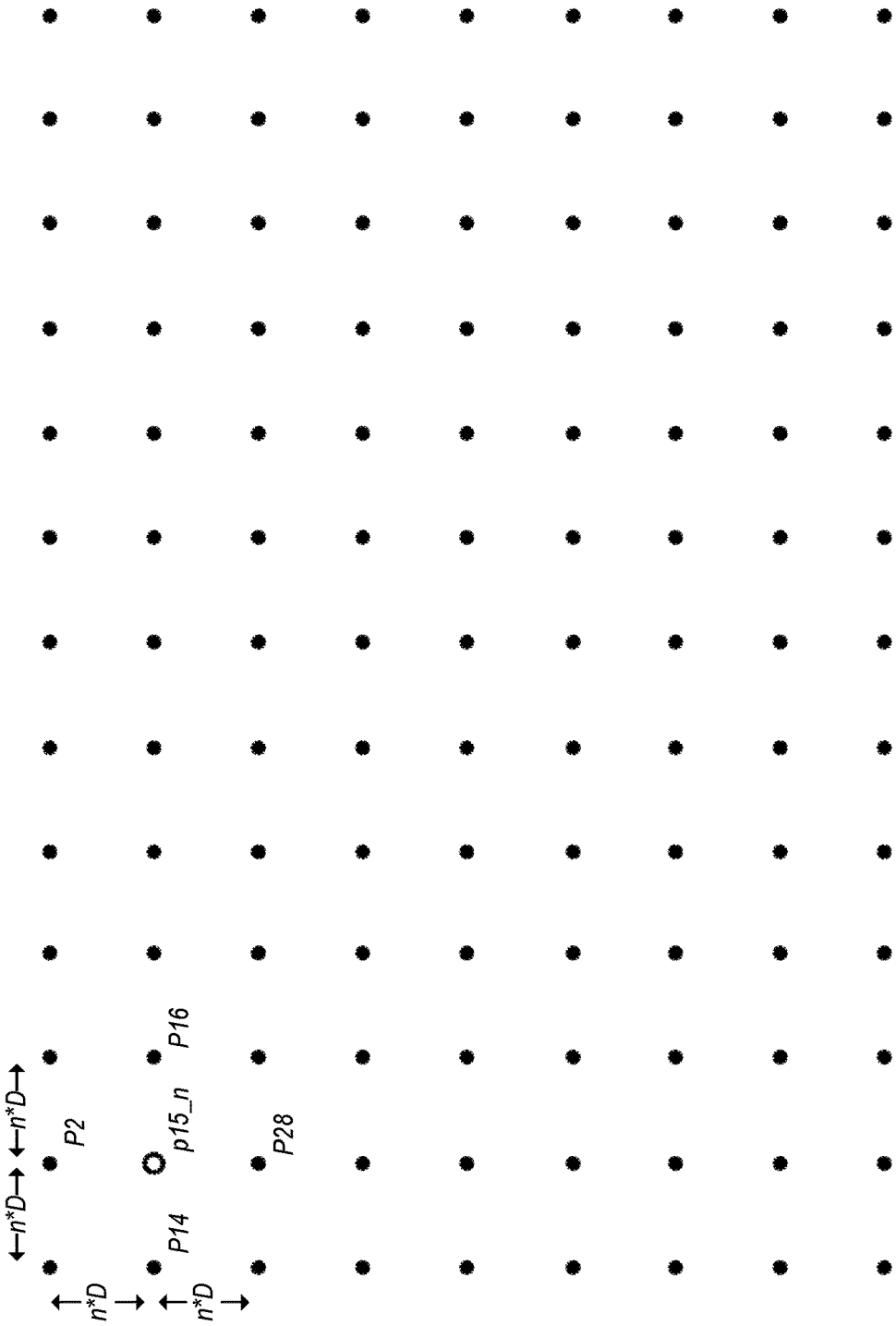

An illustration of a first iteration of step 240 is shown in FIG. 3D, where the pressure value for a location is represented by "p #_n". By way of example, as illustrated by FIG. 3E, p15_$n$ can be derived from a combination of reference-level pressures P2, P14, P16, and P28 from locations that are the first distance away from the location of p15_$n$. One combination is an average of those reference pressures (e.g., p15_$n$=average of P2, P14, P16, and P28).

Figure 3F:
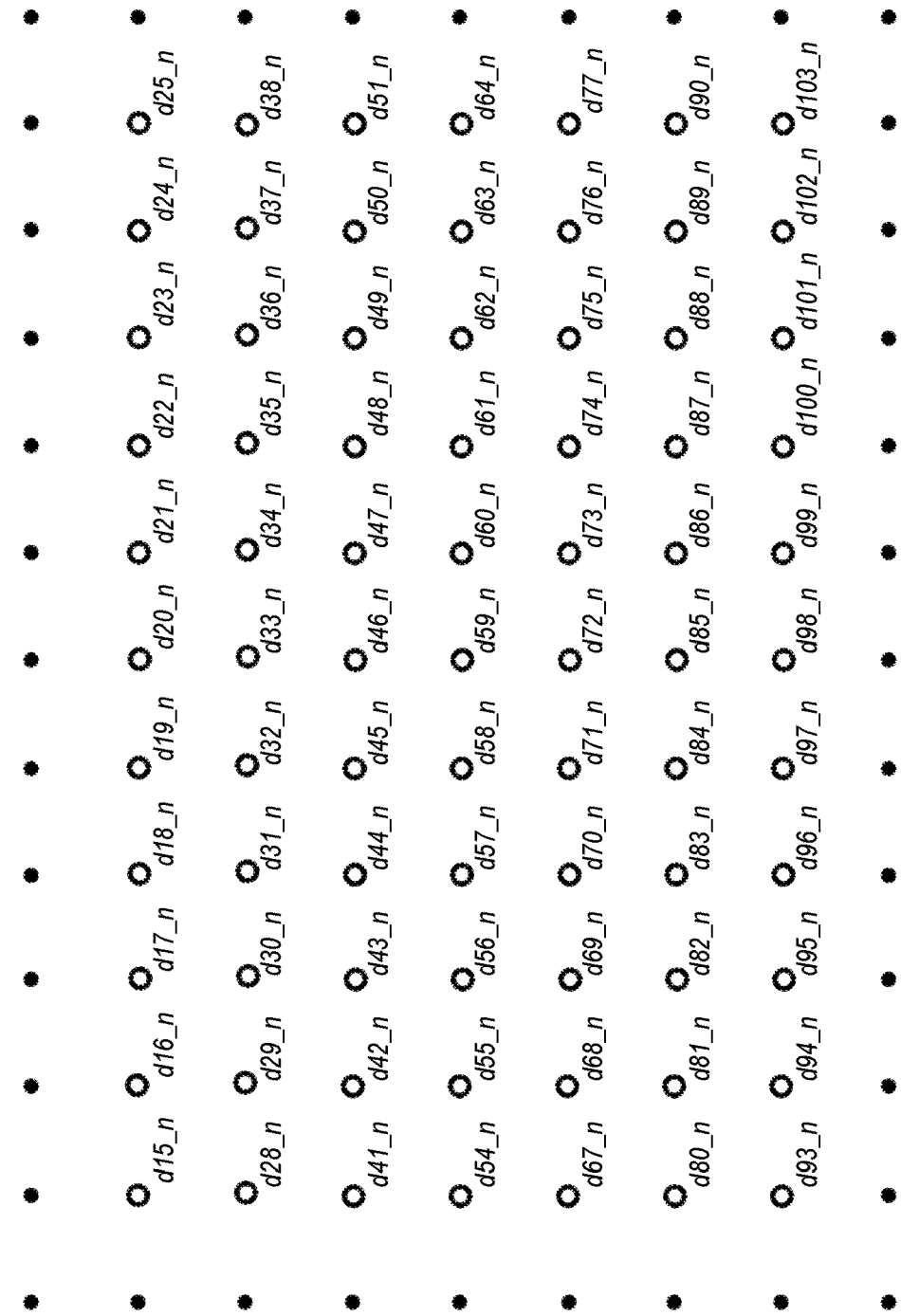

An illustration of a first iteration of step 250 is shown in FIG. 3F, where the pressure difference for a location is represented by "d #_n". The pressure difference d #_n is based on a difference between the reference-level pressure P # and the pressure value p #_n for the location.

Figure 3G:
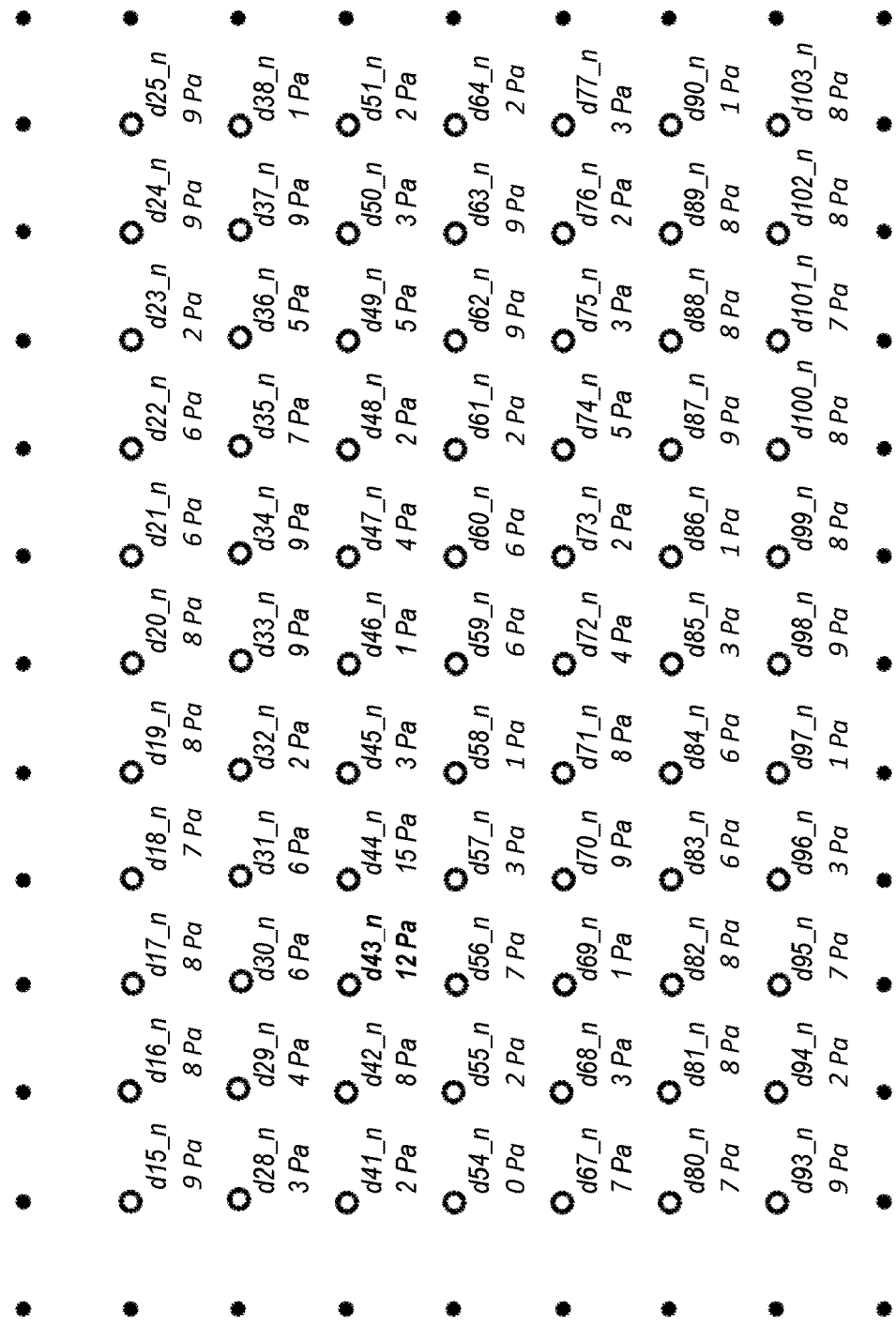

An illustration of a first iteration of step 260 is shown in FIG. 3G, where d43_$n$ represents the largest pressure difference of 12 Pa, which would not exceed a 30 Pa threshold, so the process advances to step 280, which is assumed to result in returning to step 230.

Figure 3H:
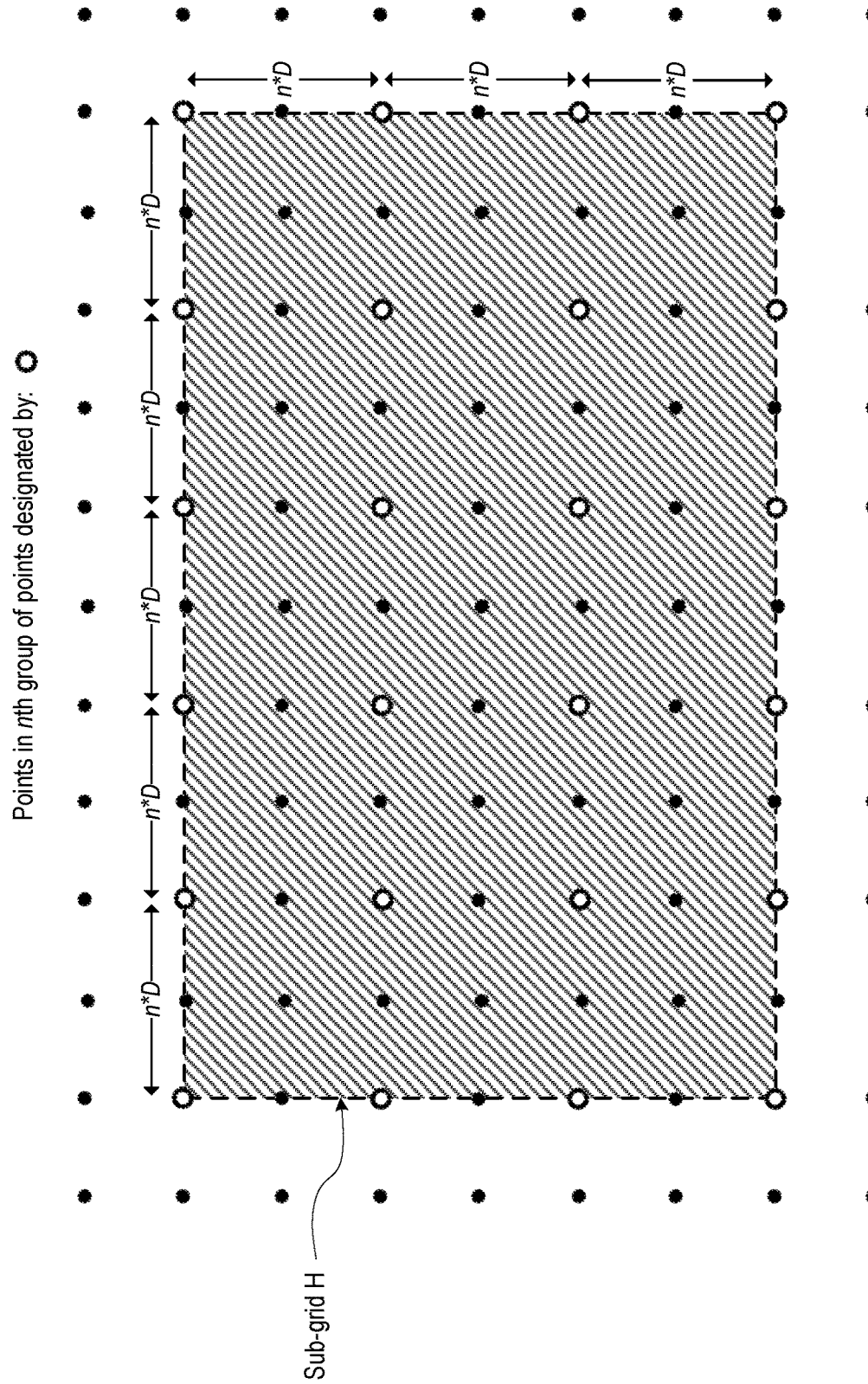

An illustration of a second iteration of step 230 is shown in FIG. 3H, which shows a second group of points designed by rings that are uniformly distributed by a second distance 2*D.

Figure 3I:
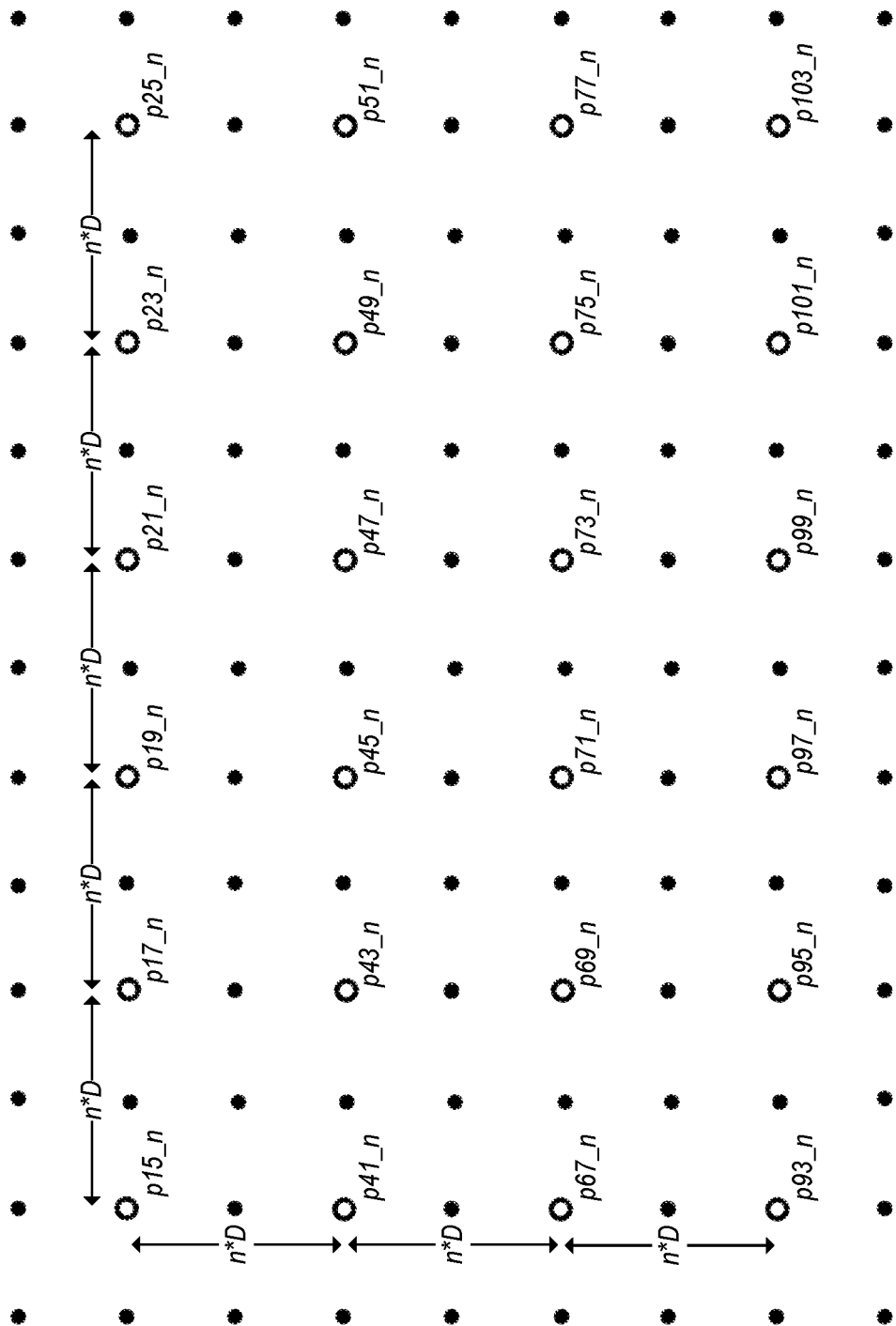
Figure 3J:
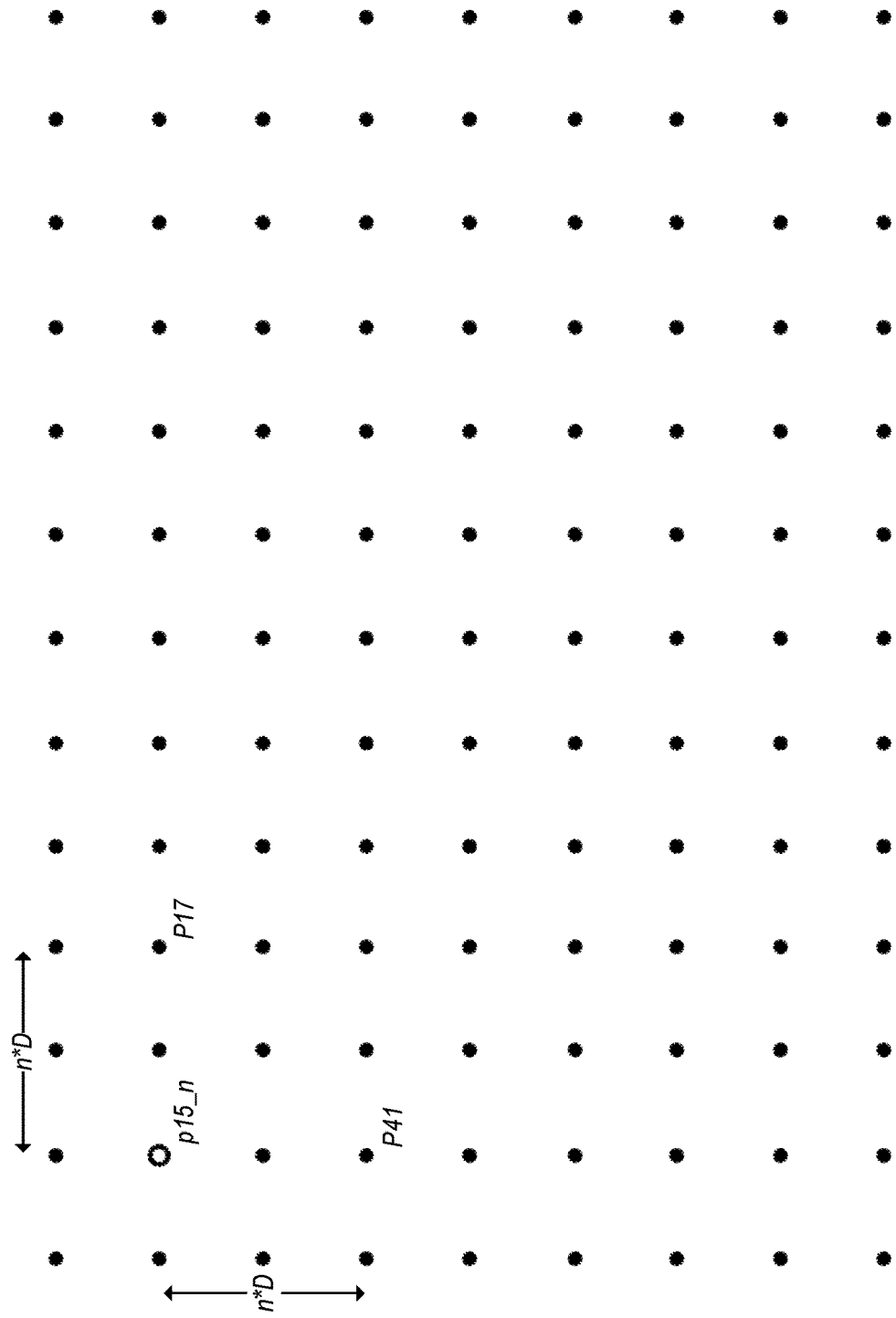

An illustration of a second iteration of step 240 is shown in FIG. 3I, where the pressure value for a location is represented by "p #_n". The pressure value of the second iteration of step 240 for a point can be different than the pressure value of the first iteration of step 240 for the same point. By way of example, as illustrated by FIG. 3J, p15_$n$ can be derived from a combination of reference-level pressures P17 and P41 for locations that are the second distance away from the location of p15_$n$. One combination is an average of those reference pressures (e.g., p15_$n$=average of P17 and P41). Because of the position of p15_$n$ relative to edge points of the grid G, only two locations are separated from the position of p15_$n$ by the second distance.

Figure 3K:
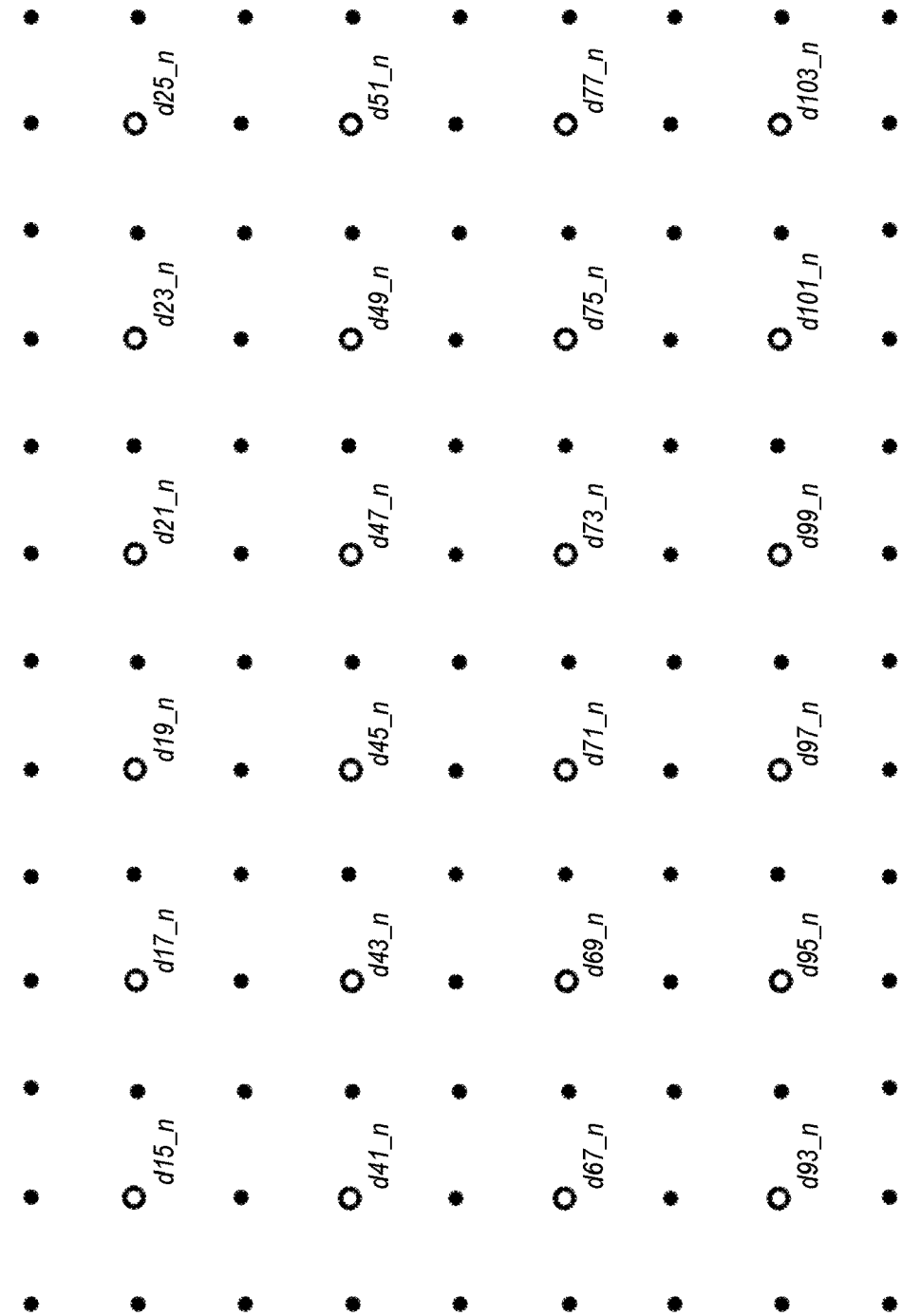

An illustration of a second iteration of step 250 is shown in FIG. 3K, where the pressure difference for a location is represented by "d #_n". The pressure difference d #_n is based on a difference between the reference-level pressure P # and the pressure value p #_n for the location.

Figure 3L:
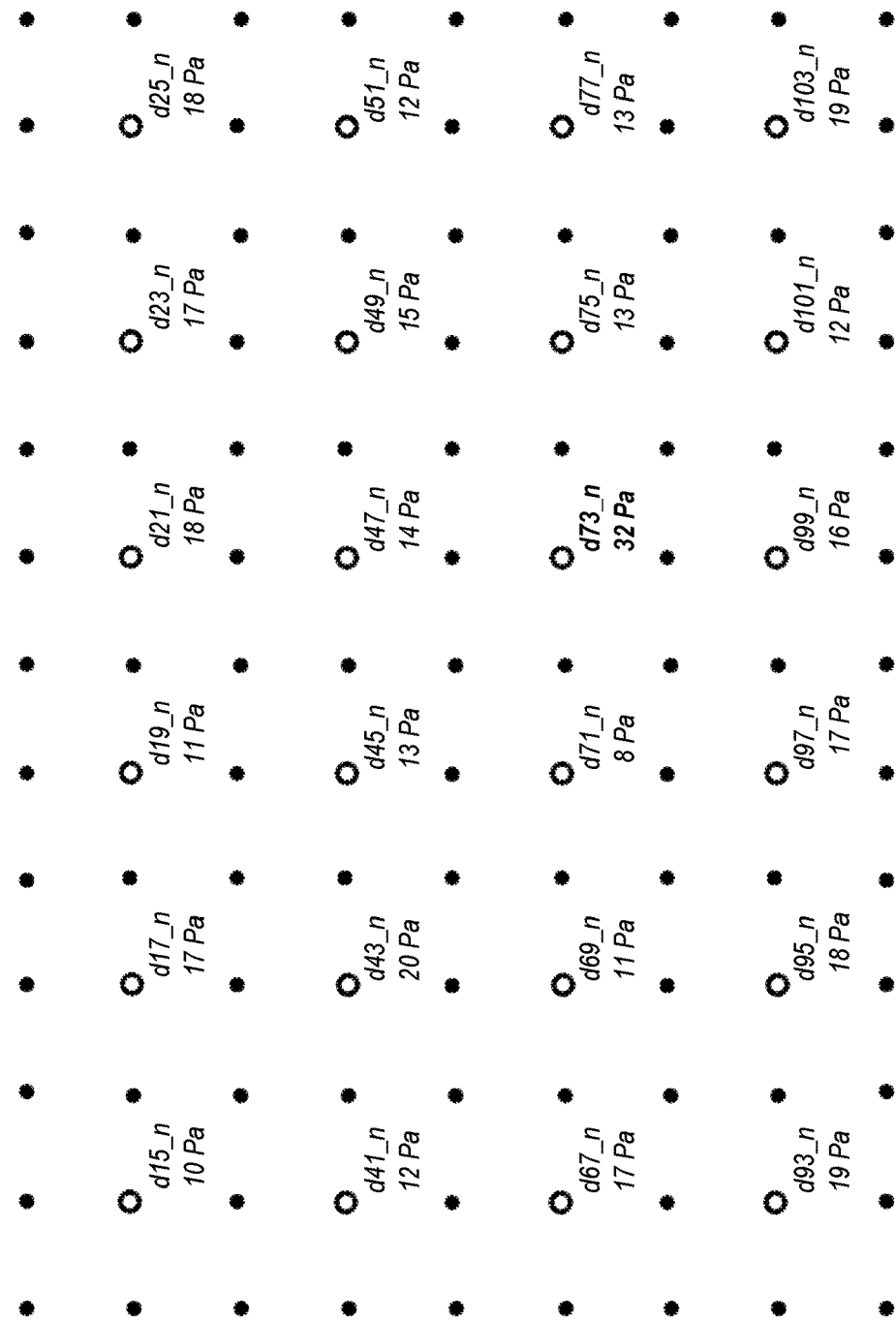

An illustration of a second iteration of step 260 is shown in FIG. 3L, where d73_$n$ represents the largest difference of 32 Pa, which would exceed a 30 Pa threshold, so the process advances to step 270, and the maximum distance is set to the second distance.

Figure 3M:
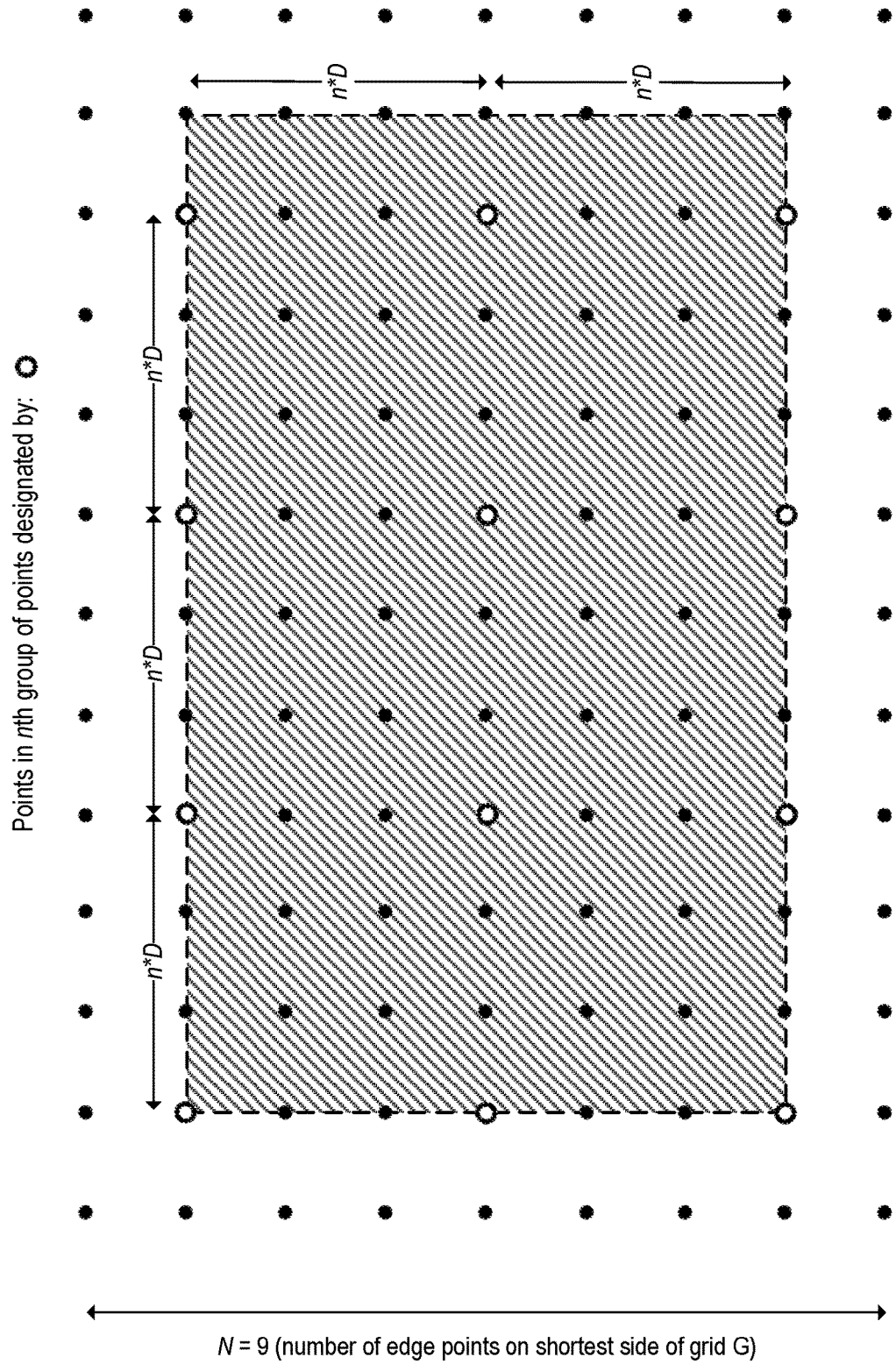

When the set of points forms the grid G of points with four sides, the final value of n (i.e., the number of groups that are evaluated during iterations of the process of FIG. 2) can be made to depend on the number of edge points on the shortest side of the grid G. By way of example, the number of edge points on the shortest side of the grid G is shown in FIG. 3M as 9 edge points. In a preferred embodiment, the final value of n is set to N/2−1 (rounded down to the nearest integer as needed) for N edge points on the shortest side of the grid G (e.g., 9/2−1=3.5 rounded down to n=3). A similar approach can be used for other shapes with definable sides.

Figure 4A:
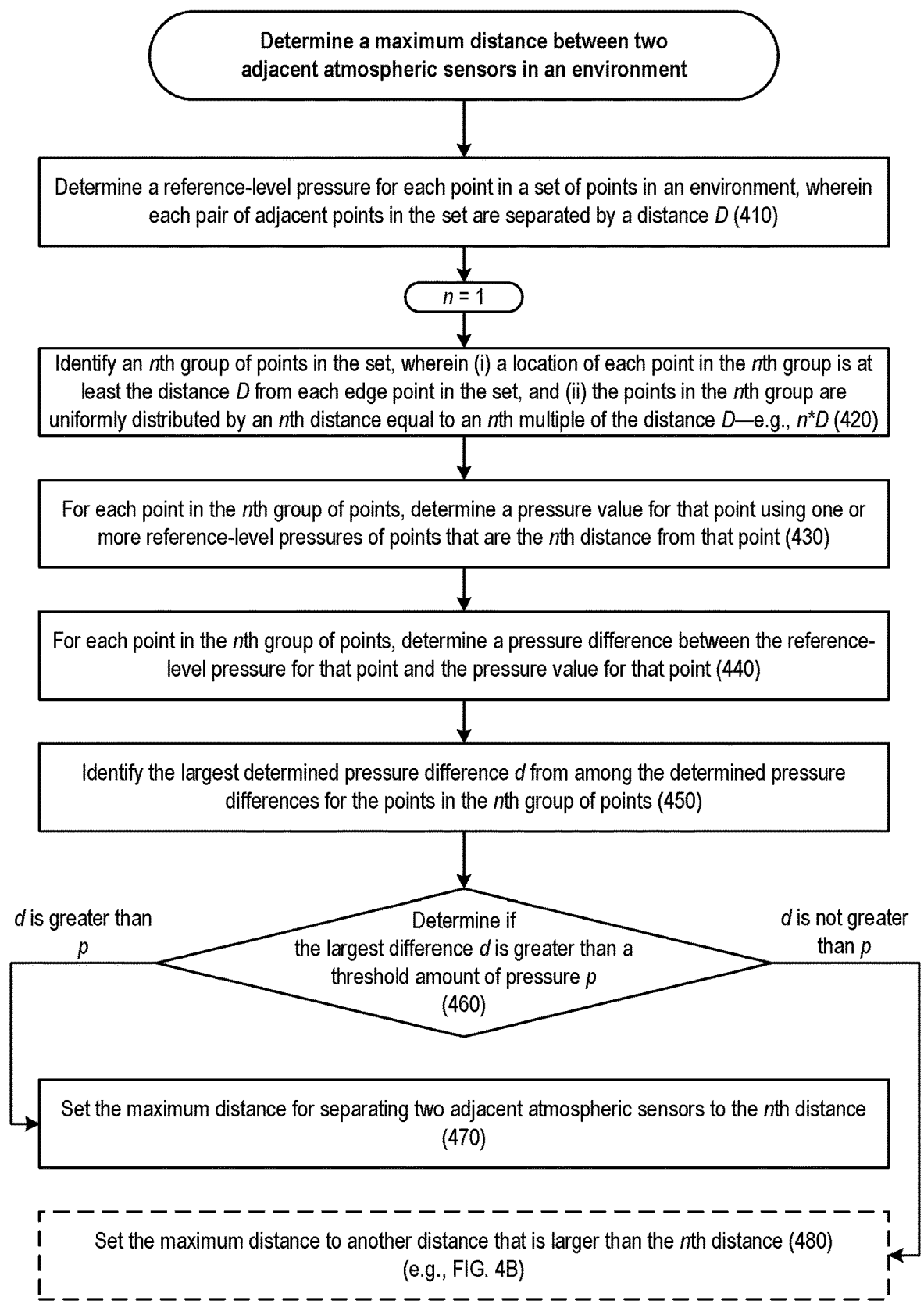
FIG. 4A depicts another process for determining a maximum distance between two adjacent atmospheric sensors in an environment.

Another process for determining a maximum distance between any two adjacent atmospheric sensors in an environment is shown in FIG. 4A and described below.

Initially, during step 410, a reference-level pressure is determined for each point in a set of points in an environment, where each point represents a location in the environment, and where each pair of adjacent points in the set are separated by a distance D. The distance D may be a predefined distance such as a resolution of an available set of points from the NOAA (e.g., 3 kilometers), or another source. By way of example, "adjacent" points include points that neighbor each other (e.g., are next to each). The reference-level pressures for particular points can be determined using different approaches, including (i) identifying the reference-level pressure for each point in the set from an available source (e.g., a NOAA weather map), (ii) determining each reference-level pressure by converting measured pressures from each point to the reference-level pressure, or (iii) determining each reference-level pressure from a spatial distribution of reference-level pressures that was determined using measurements of pressure throughout the environment.

Figure 5:
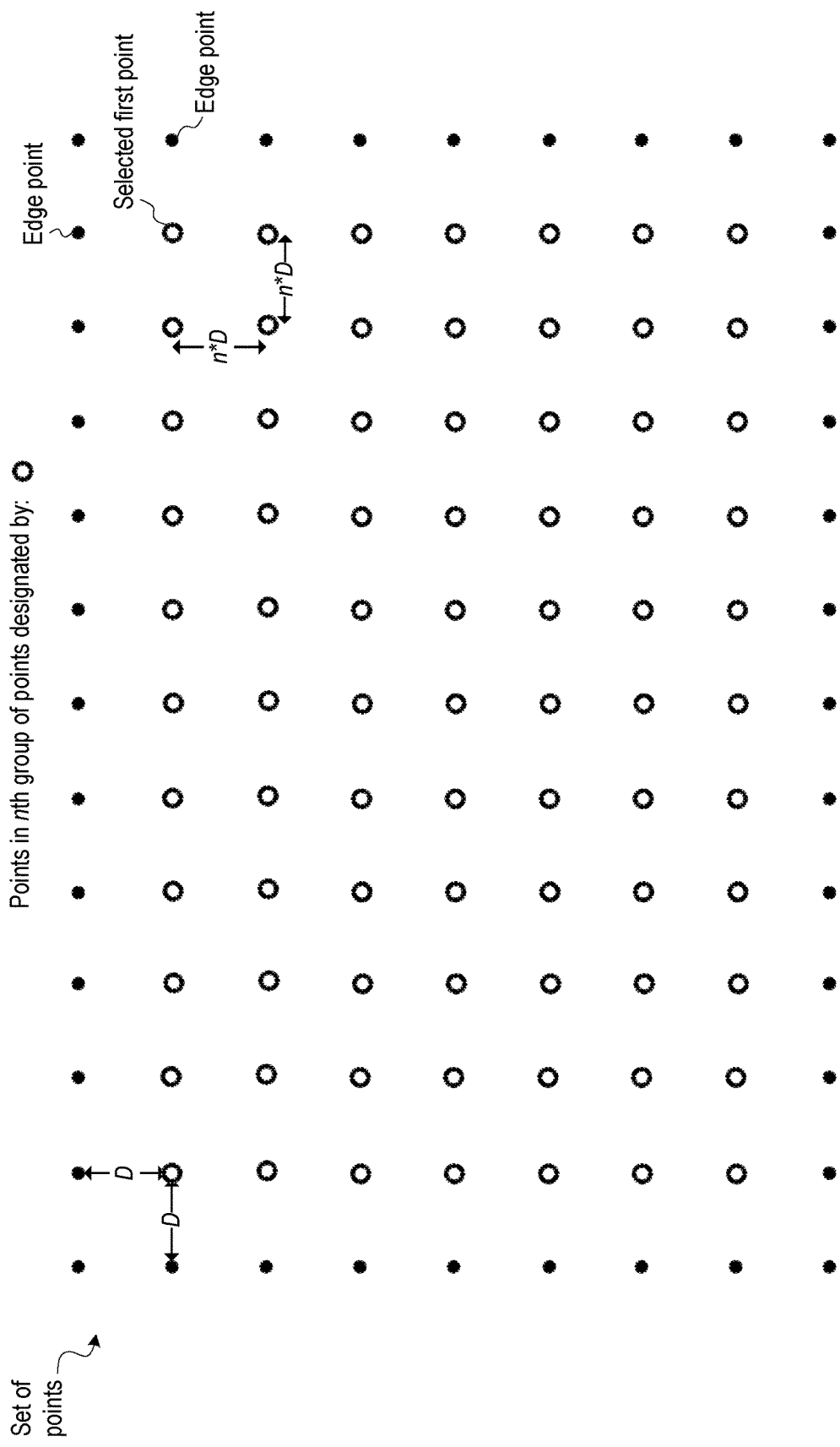
FIG. 5 illustrates one implementation for identifying a group of points in a set points during the process of FIG. 4A.

During a first iteration of step 420 (i.e., n=1), an nth group of points are identified from the set such that (i) a location of each point in the nth group is at least the distance D from each edge point in the set, and (ii) the points in the nth group are uniformly distributed by an nth distance equal to an nth multiple of the distance D—e.g., n*D. One embodiment of step 420 is illustrated in FIG. 5, which illustrates that identifying the nth group may comprise: selecting a first point from the set of points that is an nth predefined distance (e.g., the distance D, or the nth distance n*D) from two edge points of the set of points; and selecting points for inclusion in the nth group such that the selected points include the first selected point and are uniformly distributed by the nth distance.

For each point in the nth group of points, a pressure value for that point is determined using one or more reference-level pressures of points that are the nth distance (e.g., n*D) from that point during step 430. In a first embodiment of step 430, the pressure value is determined using a mathematical combination of two or more reference-level pressures (e.g., the pressure value is an average of reference-level pressures for any combination of two, three or four points that are the nth distance from the point). In a second embodiment of step 430, the pressure value is determined using bilinear interpolation of all reference-level pressures for all points that are separated from the point by the nth distance. In a third embodiment of step 430, the pressure value is determined to be any reference-level pressure of any point that is the nth distance from the point. In a fourth embodiment of step 430, the pressure value is determined to be a first reference-level pressure of a point located the nth distance from the point that differs most from a reference-level pressure of the point as compared to other reference-level pressures of points that are located the nth distance from the point. In an alternative embodiment of step 430, the pressure value is determined as the reference-level pressure of the closet point in the nth group of points to the point, or an average of reference-level pressures of closet points in the nth group of points to the point.

For each point in the nth group of points, a pressure difference between the reference-level pressure for that point and the pressure value for that point is determined during step 440, and the largest pressure difference d from among the determined pressure differences is identified during step 450.

During step 460, a determination is made as to whether the largest difference d is greater than a threshold amount of pressure p. One example of the threshold amount of pressure is a pressure value corresponding to a predetermined amount of tolerated altitude error when computing an altitude of mobile device residing in the environment (e.g., where 1 meter of tolerated error typically corresponds to a 10 Pa threshold amount of tolerated pressure difference between reference-level pressures for the same reference-level altitude).

When the largest difference d is determined to be greater than the threshold amount of pressure, a maximum distance for separating two adjacent atmospheric sensors is set to the nth distance (e.g., n*D) during step 470.

When the largest difference d is determined to not be greater than the threshold amount of pressure, the maximum distance is set to another distance that is larger than the nth distance during step 480. In one embodiment of step 480, setting the maximum distance to another distance that is larger than the nth distance uses the process shown in FIG. 4B.

Figure 4B:
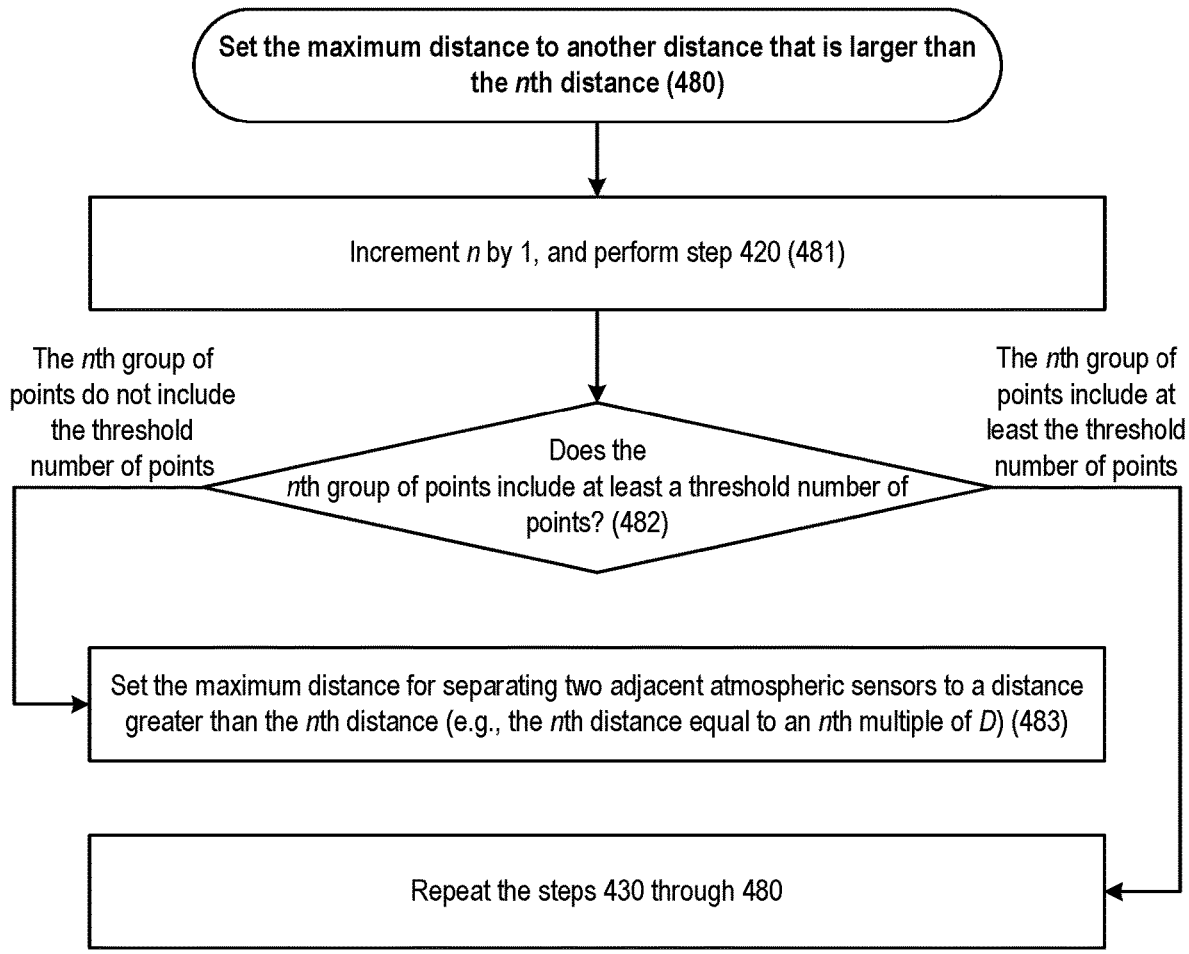
FIG. 4B depicts one embodiment for determining a maximum distance between any two adjacent atmospheric sensors in an environment using the process of FIG. 4A.

As shown in FIG. 4B, another group of points are identified from the set—e.g., the value of n is incremented by 1 during sub-step 481 and an nth iteration of step 420 is performed where an nth group of points are identified from the set such that (i) a location of each point in the nth group is at least the distance D from each edge point in the set, and (ii) the points in the nth group are uniformly distributed by an nth distance equal to an nth multiple of the distance D—i.e., n*D.

During sub-step 482, a determination is made as to whether nth group of points include at least a threshold number of points. Examples of a threshold number of points in sub-step 482 include: (i) a predefined threshold percentage of the number of points in the set of points (e.g., 10% or another percentage); (ii) a number based on a number N of edge points on the shortest dimension of the set of points and a number M of edge points on the longest dimension of the set of points (e.g., computing a first number by rounding down N/2−1 to the nearest integer, computing a second number by rounding down the result of M divided by the first number to the nearest integer, and computing the threshold number of points by multiplying the first number and the second number), or (iii) another number.

If the nth group of points do not include the threshold number of points, the maximum distance for separating two adjacent atmospheric sensors is set to a distance greater than the nth distance during sub-step 483, such as an nth distance equal to an nth multiple of D. If the nth group of points includes the threshold number of points, the nth iterations of steps 430 through 480 are performed. Use of a threshold number of points to determine the maximum spacing between atmospheric sensors advantageously ensures a minimum amount of data is evaluated.

In one embodiment, the processes of FIG. 4A and FIG. 4B can be performed multiple times, but for different groups of points when n is equal to or greater than two, and the results of all performances can be used to choose the maximum distance that is actually used—e.g., each maximum distance determined for each performance can be averaged, and the averaged value can be set to the maximum distance that is actually used; e.g., each maximum distance determined for each performance can be compared, and the smallest distance can be set to the maximum distance that is actually used. By way of example, processes of FIG. 4A and FIG. 4B may be performed by one or more machines that include: processor(s) or other computing device(s) (e.g., a personal computer, server and/or other) for performing (e.g., that perform, or are configured, adapted or operable to perform) each step, and data source(s) at which any data identified in the processes is stored for later access during the processes.

Figure 6A:
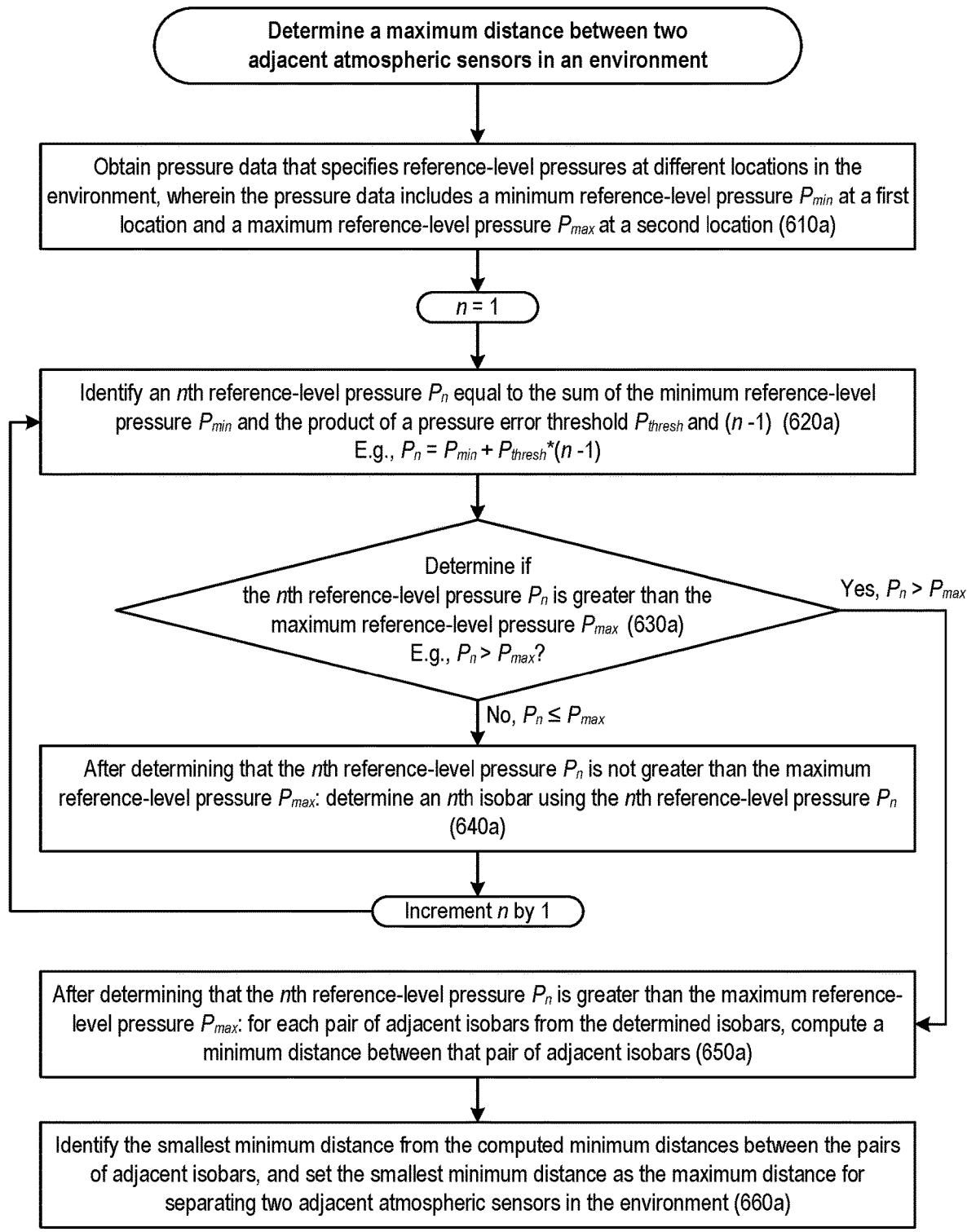
FIG. 6A and FIG. 6B depict other processes for determining a maximum distance between two adjacent atmospheric sensors in an environment.
Figure 6B:
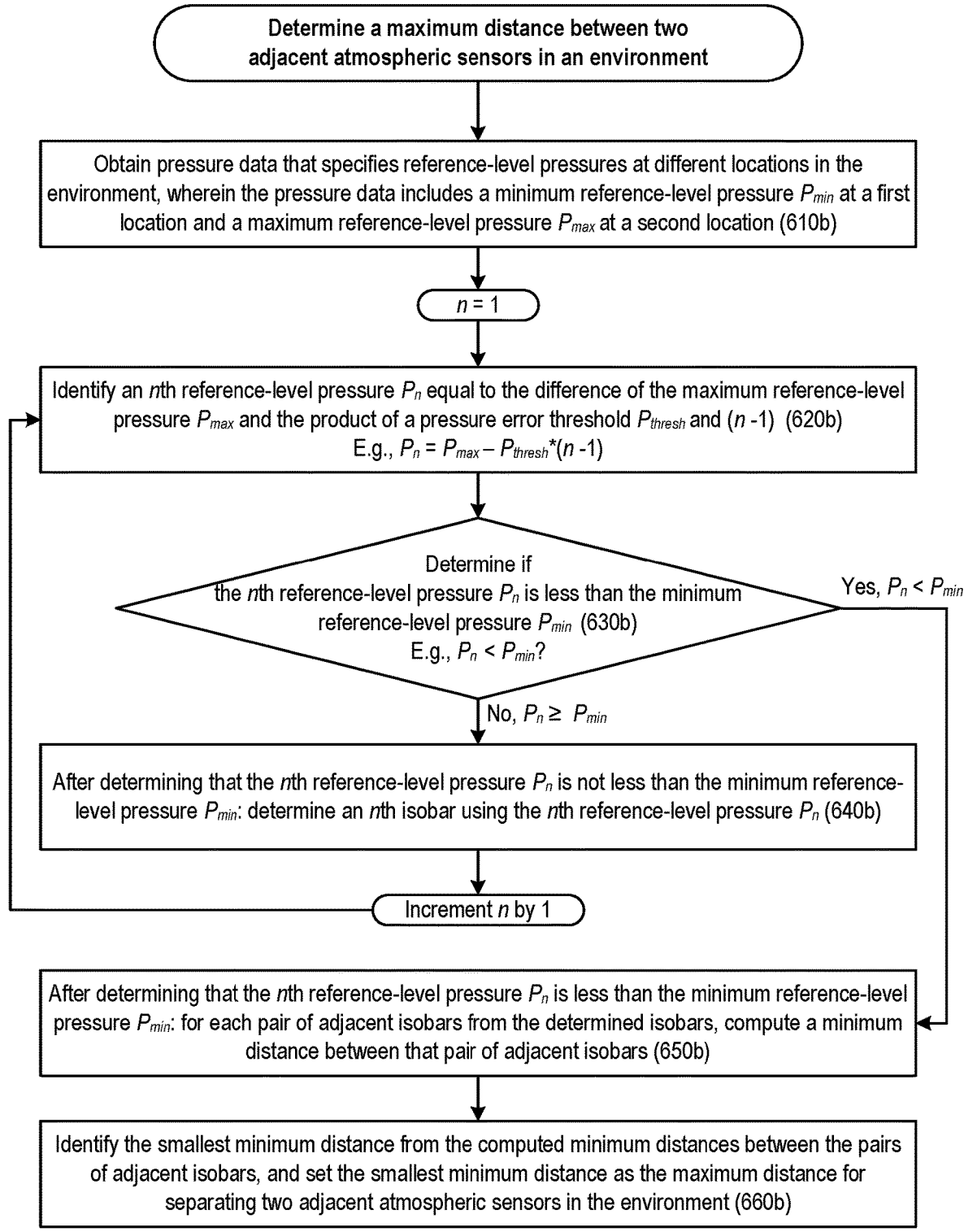

FIG. 6A and FIG. 6B depict other processes for determining a maximum distance between two adjacent atmospheric sensors in an environment.

As shown in FIG. 6A, step 610a obtains pressure data that specifies reference-level pressures at different locations in the environment, wherein the pressure data includes a minimum reference-level pressure $P_{min}$ in at a first location and a maximum reference-level pressure $P_{max}$ at a second location.

Step 620a identifies an nth reference-level pressure $P_n$ equal to the sum of the minimum reference-level pressure $P_{min}$ and the product of a pressure error threshold $P_{thresh}$ and (n−1) for a value of n (which starts at a first number such as n=1 for a first iteration of step 620a)—e.g., $P_n=P_{min}+P_{thresh}*(n-1)$.

Step 630a determines if the nth reference-level pressure $P_n$ is greater than the maximum reference-level pressure $P_{max}$—e.g., if $P_n>P_{max}$. If the nth reference-level pressure $P_n$ is not greater than the maximum reference-level pressure $P_{max}$ (e.g., $P_n \leq P_{max}$), the process advances to step 640a. If the nth reference-level pressure $P_n$ is greater than the maximum reference-level pressure $P_{max}$ (e.g., $P_n>P_{max}$), the process advances to step 650a.

Step 640a determines an nth isobar representing the nth reference-level pressure $P_n$. After step 640a, n is increased by 1, and the process returns to step 620a for the new value of n.

For each pair of adjacent isobars from the determined isobars, step 650a computes a minimum distance between that pair of adjacent isobars.

Step 660a identifies the smallest minimum distance from the computed minimum distances between the pairs of adjacent isobars, and sets the smallest minimum distance as the maximum distance for separating two adjacent atmospheric sensors in the environment.

As shown in FIG. 6B, step 610b obtains pressure data that specifies reference-level pressures at different locations in the environment, wherein the pressure data includes a minimum reference-level pressure $P_{min}$ at a first location and a maximum reference-level pressure $P_{max}$ at a second location.

Step 620b identifies an nth reference-level pressure $P_n$ equal to the difference of the maximum reference-level pressure $P_{max}$ and the product of a pressure error threshold $P_{thresh}$ and (n−1) for a value of n (which starts at a first number such as n=1 for a first iteration of step 620b)—e.g., $P_n=P_{max}-P_{thresh}*(n-1)$.

Step 630b determines if the nth reference-level pressure $P_n$ is less than the minimum reference level pressure $P_{min}$—e.g., if $P_n<P_{min}$. If the nth reference-level pressure $P_n$ is not less than the minimum reference-level pressure $P_{min}$ (e.g., $P_n>P_{min}$), the process advances to step 640b. If the nth reference-level pressure $P_n$ is less than the minimum reference-level pressure $P_{min}$ (e.g., $P_n<P_{min}$), the process advances to step 650b.

Step 640b determines an nth isobar representing the nth reference-level pressure $P_n$. After step 640b, n is increased by 1, and the process returns to step 620b for the new value of n.

For each pair of adjacent isobars from the determined isobars, step 650b computes a minimum distance between that pair of adjacent isobars.

Step 660b identifies the smallest minimum distance from the computed minimum distances between the pairs of adjacent isobars, and set the smallest minimum distance as the maximum distance for separating two adjacent atmospheric sensors in the environment.

Figure 7:
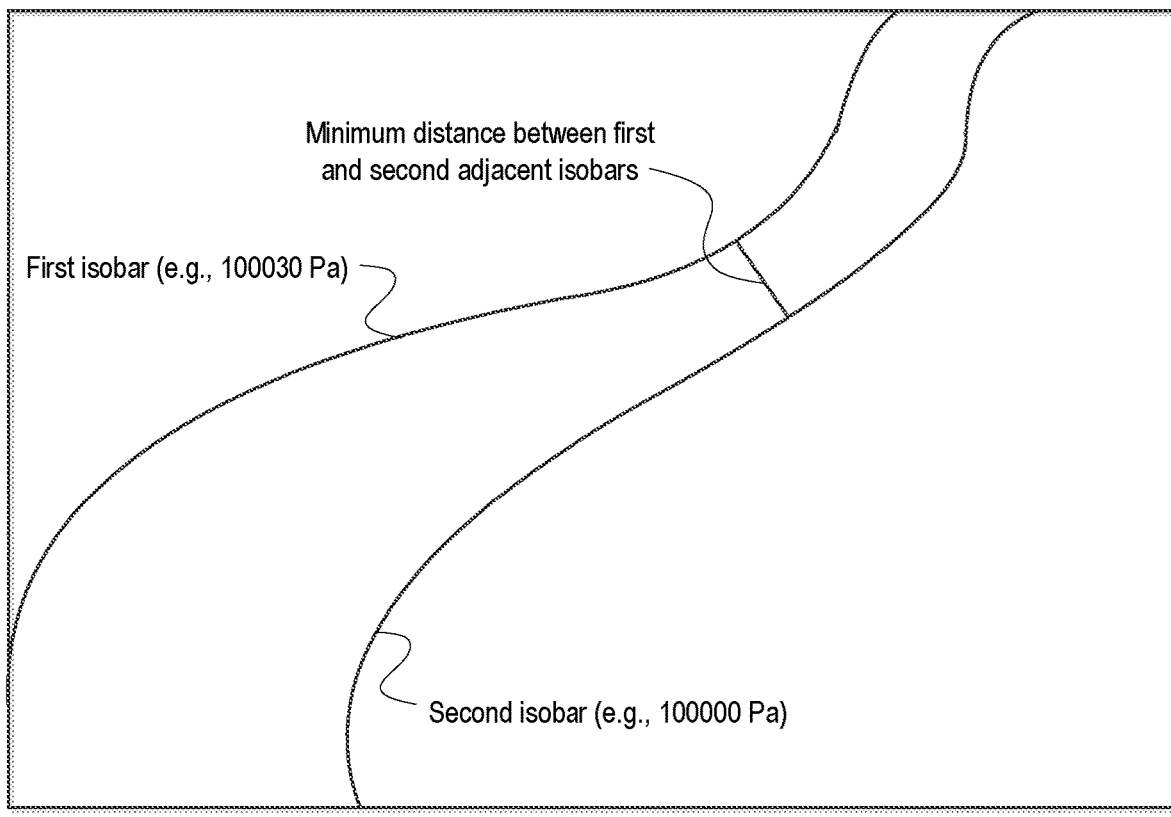
FIG. 7 depicts a minimum distance among other distances between two adjacent isobars as determined using the processes of FIG. 6A and FIG. 6B.

By way of illustration, FIG. 7 depicts a minimum distance between two adjacent isobars separated by a predefined amount of pressure. The minimum distance may be the actual minimum distance, the smallest distance of a plurality of distances measured perpendicularly from the first isobar to the second isobar, or the smallest distance of a plurality of distances measured perpendicularly from the second isobar to the first isobar.

By way of example, processes of FIG. 6A and FIG. 6B may be performed by one or more machines that include: processor(s) or other computing device(s) (e.g., a personal computer, server and/or other) for performing (e.g., that perform, or are configured, adapted or operable to perform) each step, and data source(s) at which any data identified in the processes is stored for later access during the processes.

The processes shown in FIG. 6A and FIG. 6B determine the spacing between atmospheric sensors as the smallest distance between two adjacent isobars having a contour interval equal to a predefined altitude accuracy threshold (e.g., 30 Pa for 3 meters of tolerated altitude error). Each isobar can be generated by a standard contour package that uses a higher order interpolation (e.g., cubic) scheme. The contour package computes the position (e.g., in terms of latitude and longitude) of points that have the same pressure. The line joining these points constitutes an isobar. By way of example, a first isobar can represent a minimum pressure value found in a field of mean sea level pressures, and a second isobar can represent a pressure value that is the predefined altitude accuracy threshold (e.g., 30 Pa) more than the pressure value of the first isobar. The process is repeated until the maximum pressure value in the pressure field is reached.

The processes described above can provide a uniform spacing, or approximate uniform spacing between adjacent atmospheric sensors along an x-axis and a y-axis in an environment. For example, the atmospheric sensors may be arranged in a grid structure with grid points along both directions separated by the spacing computed using the processes described above (or a lesser amount of spacing), which may be used over any region. An alternative approach that does not compute a maximum amount of spacing is described below.

Figure 8A:
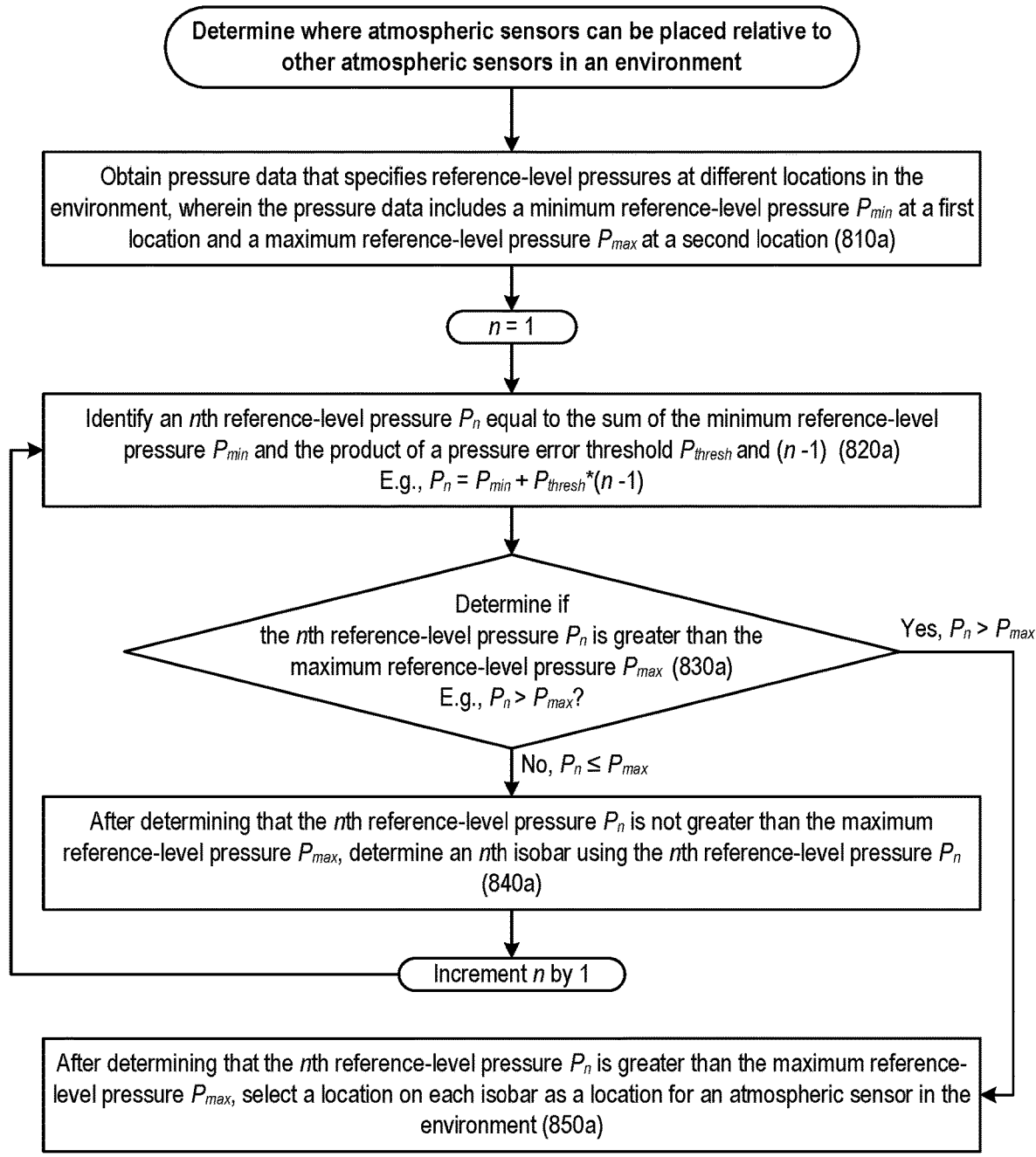
FIG. 8A and FIG. 8B depict processes for determining where atmospheric sensors can be placed relative to other atmospheric sensors in an environment.
Figure 8B:
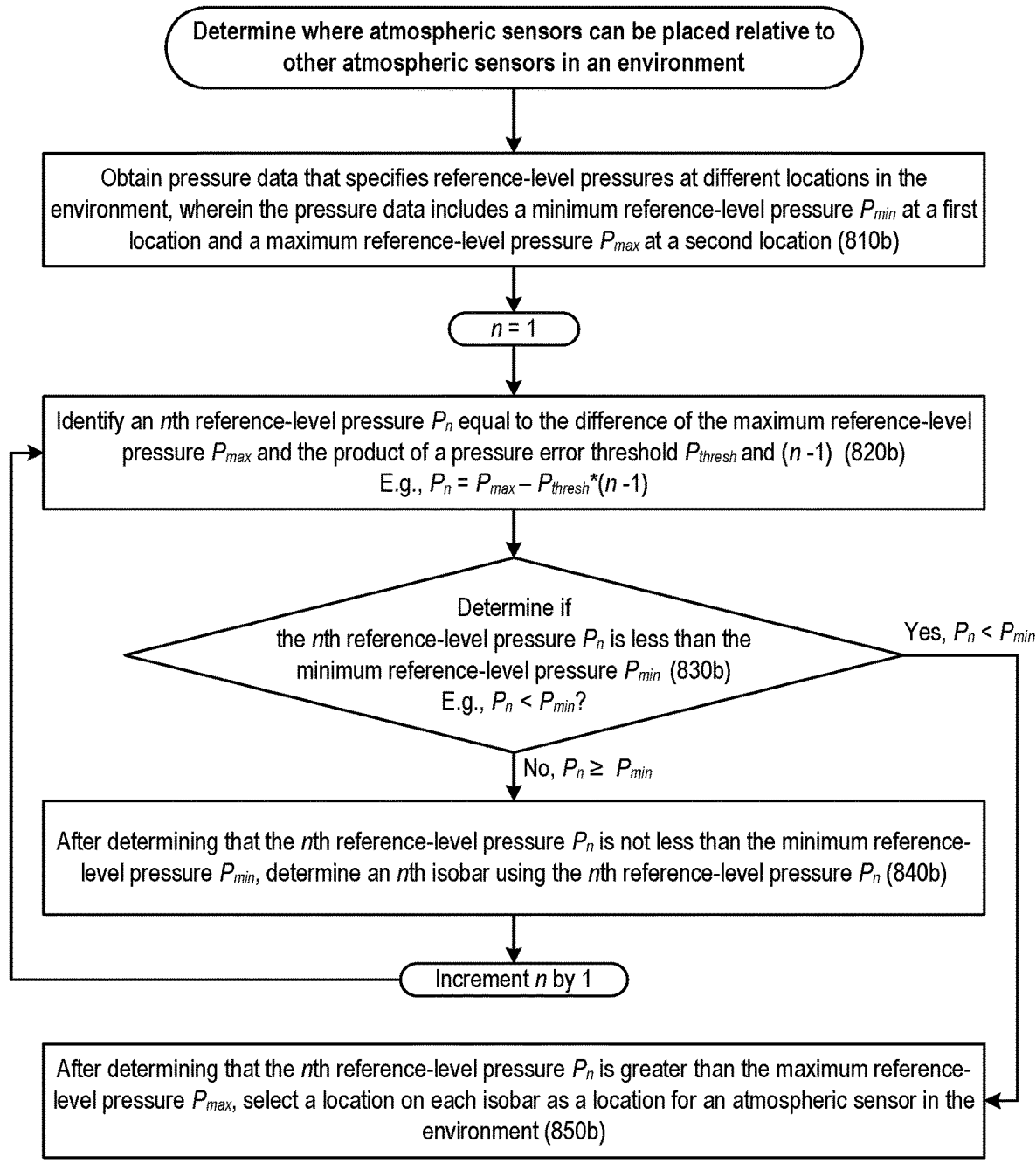

Determine where Atmospheric Sensors can be Placed Relative to Other Atmospheric Sensors in an Environment FIG. 8A and FIG. 8B depict processes for determining where atmospheric sensors can be placed relative to other atmospheric sensors in an environment.

One process for determining where atmospheric sensors can be placed relative to other atmospheric sensors in an environment is shown in FIG. 8A.

Step 810a obtains pressure data that specifies reference-level pressures at different locations in the environment, wherein the pressure data includes a minimum reference-level pressure $P_{min}$ at a first location and a maximum reference-level pressure $P_{max}$ at a second location.

Step 820a identifies an nth reference-level pressure $P_n$ equal to the sum of the minimum reference-level pressure $P_{min}$ and the product of a pressure error threshold $P_{thresh}$ and (n−1) for a value of n (which starts at a first number such as n=1 for a first iteration of step 820a)—e.g., $P_n = P_{min} + P_{thresh}*(n-1)$.

Step 830a determines if the nth reference-level pressure $P_n$ is greater than the maximum reference-level pressure $P_{max}$—e.g., if $P_n > P_{max}$. If the nth reference-level pressure $P_n$ is not greater than the maximum reference-level pressure $P_{max}$ (e.g., $P_n \leq P_{max}$), the process advances to step 840a. If the nth reference-level pressure $P_n$ is greater than the maximum reference-level pressure $P_{max}$ (e.g., $P_n > P_{max}$), the process advances to step 850a.

Step 840a determines an nth isobar using the nth reference-level pressure $P_n$. After step 840a, n is increased by 1, and the process returns to step 820a for the new value of n.

Step 850a selects a location on each isobar as a location for an atmospheric sensor in the environment. In one embodiment of step 850a, an atmospheric sensor is placed anywhere on an isobar, which advantageously permits more options for installing atmospheric sensors compared to approaches that require atmospheric sensors to be within the same distance of each other. Having more installation options avoids circumstances sometimes encountered by other approaches where less installation location candidates are unavailable. Having more installation options can reduce costs in situations where the cheapest installation location can be selected as opposed to having less installation location candidates that are comparatively more costly. In other embodiments of step 850a, an atmospheric sensor is placed on each isobar (i) at a particular position (e.g., in the middle) of the isobar, (ii) at accessible or available locations in the environment (e.g., when some locations along an isobar are inaccessible or unavailable), (iii) at a location on the isobar with a particular installation cost (e.g., the least expensive, or lower than a threshold cost), (iv) such that a distance between any location in the environment and an atmospheric sensor on any isobar is within a predefined maximum distance, (v) within a predefined distance from at least one other atmospheric sensor in the environment, or (vi) another manner of placement. In some embodiments, a preset number of atmospheric sensors greater than one are placed on each isobar for redundancy or other purposes.

Another process for determining where atmospheric sensors can be placed relative to other atmospheric sensors in an environment is shown in FIG. 8B.

Step 810b obtains pressure data that specifies reference-level pressures at different locations in the environment, wherein the pressure data includes a minimum reference-level pressure $P_{min}$ at a first location and a maximum reference-level pressure $P_{max}$ at a second location.

Step 820b identifies an nth reference-level pressure $P_n$ equal to the difference of the maximum reference-level pressure $P_{max}$ and the product of a pressure error threshold $P_{thresh}$ and (n−1) for a value of n (which starts at a first number such as n=1 for a first iteration of step 820b)—e.g., $P_n = P_{max} - P_{thresh}*(n-1)$.

Step 830b determines if the nth reference-level pressure $P_n$ is less than the minimum reference level pressure $P_{min}$—e.g., if $P_n < P_{min}$. If the nth reference-level pressure $P_n$ is not less than the minimum reference-level pressure $P_{min}$ (e.g., $P_n \geq P_{min}$), the process advances to step 840b. If the nth reference-level pressure $P_n$ is less than the minimum reference-level pressure $P_{min}$ (e.g., $P_n < P_{min}$), the process advances to step 850b.

Step 840b determines an nth isobar using the nth reference-level pressure $P_n$. After step 840b, n is increased by 1, and the process returns to step 820b for the new value of n.

Step 850b selects a location on each isobar as a location for an atmospheric sensor in the environment. The same embodiments described above for step 850a can be used for step 850b.

Figure 9:
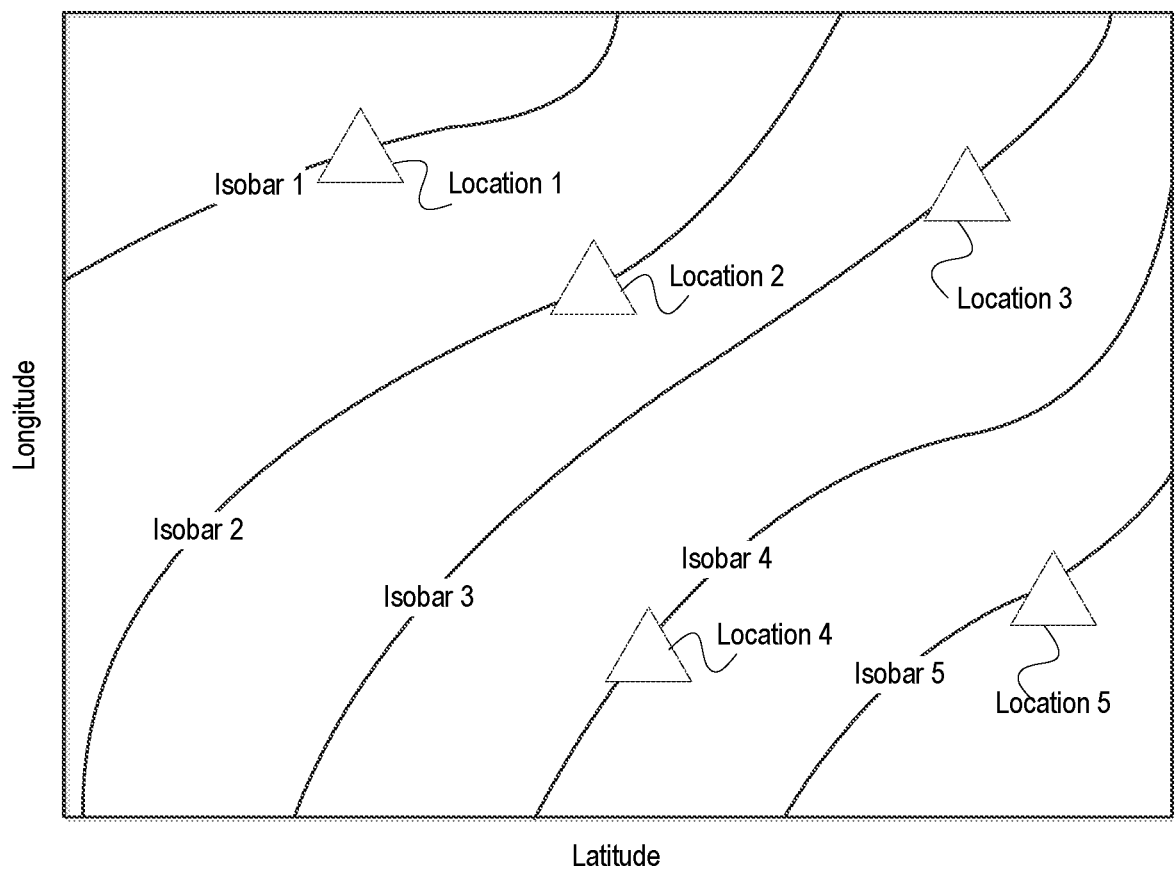
FIG. 9 depicts a distribution of atmospheric sensors at different points on different isobars as determined using the processes of FIG. 8A and FIG. 8B.

FIG. 9 depicts a distribution of atmospheric sensor locations 1-5 on different isobars 1-5. The distribution may be (i) random, (ii) based on available locations in the environment, (iii) based on a requirement that a distance between any location in the environment and an atmospheric sensor be within a predefined maximum distance, (iv) based on a requirement that each atmospheric sensor be within a predefined distance from another atmospheric sensor, or (v) based on another consideration so long as at least one atmospheric sensor is positioned on each isobar.

The processes of FIG. 8A and FIG. 8B usually use fewer atmospheric sensors than the other processes depicted in other figures, and advantageously require less cost compared those other processes. The processes of FIG. 8A and FIG. 8B are suitable for regions that have no or minor changes in pressure patterns over time (e.g., the tropics), but not suitable for other regions that have more dynamic changes in pressure patterns over time (e.g., other latitude locations outside of latitudes for the tropics).

By way of example, processes of FIG. 8A and FIG. 8B may be performed by one or more machines that include: processor(s) or other computing device(s) (e.g., a personal computer, server and/or other) for performing (e.g., that perform, or are configured, adapted or operable to perform) each step, and data source(s) at which any data identified in the processes is stored for later access during the processes.

Uses Cases

For a particular geographic region, that region can be separated into different areas (i.e. environments), and spacing of atmospheric sensors in each area can be determined using any of the processes described herein. As a result, a first way of distributing atmospheric sensors in a first area within the region may be different than a second way of distributing atmospheric sensors in a second area within the region, such that the distribution of atmospheric sensors in the region may not be uniform. In a first embodiment, the same process for determining the spacing of atmospheric sensors is used for different areas in the region. As a result, costs to install and maintain a network of atmospheric sensors in the region can be minimized when different maximum distances can be used instead of only one maximum distance, where less atmospheric sensors are needed in particular areas of the region that permit a larger maximum spacing between atmospheric sensors. In a second embodiment, different processes for determining the spacing of atmospheric sensors are used for different areas in the region (e.g., the process of FIG. 2A for one area, and the process of FIG. 6A for another area). As a result, installation of a network of atmospheric sensors in the region can be optimized based on characteristics of areas in the region that are better evaluated by different processes.

Once spacing between atmospheric sensors is determined for an environment using any of the processes in FIG. 2A, FIG. 2B, FIG. 4A, FIG. 4B, FIG. 6A and FIG. 6B, then a network of atmospheric sensors can be installed based on that spacing regardless of where the atmospheric sensors are located in the environment. As a result, some systems include a network of atmospheric sensors that are uniformly spaced by a distance equal to or less than any of the spacing values determined using processes listed above, and other systems include a network of atmospheric sensors that are not uniformly spaced such that spacing between different pairs of adjacent atmospheric sensors will vary, but will not exceed any of the spacing values determined using processes listed above.

Once relative positioning between atmospheric sensors is determined for an environment using any of the processes in FIG. 8A and FIG. 8B, then a network of atmospheric sensors can be installed based on that relative positioning.

Technical Benefits

Processes described herein can be performed to reduce the number of atmospheric sensors needed to provide atmospheric measurements that are used to estimate an altitude of a mobile device to within desired resolution (e.g., floor-level accuracy) compared to prior approaches, which reduces installation and maintenance costs associated with atmospheric sensor networks, and permits more use of atmospheric sensor networks in more environments, including environments that would otherwise not have suitable atmospheric sensor networks given the greater cost of prior approaches. Reductions to the number of atmospheric sensors in networks can result in transmission of less data (e.g., less pressure data from the reduced number of atmospheric sensors) compared to other approaches, which thereby decreases transmission costs compared to other approaches that occupy more transmission space because those other approaches transmit more pressure data from more-densely installed pressure sensors that do not take advantage of the innovative processes described herein. Similarly, decreased use of processing and battery capacity at mobile devices is made possible by the processes described herein since less processing and battery resources are used to process less pressure data from less atmospheric sensors compared to other approaches. Also, more-reliable atmospheric sensor networks that are custom-designed based on atmospheric characteristics of particular environment are possible when the processes described herein are performed, which contrasts with prior approaches that do not consider the atmospheric characteristics.

Other Aspects

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 10:
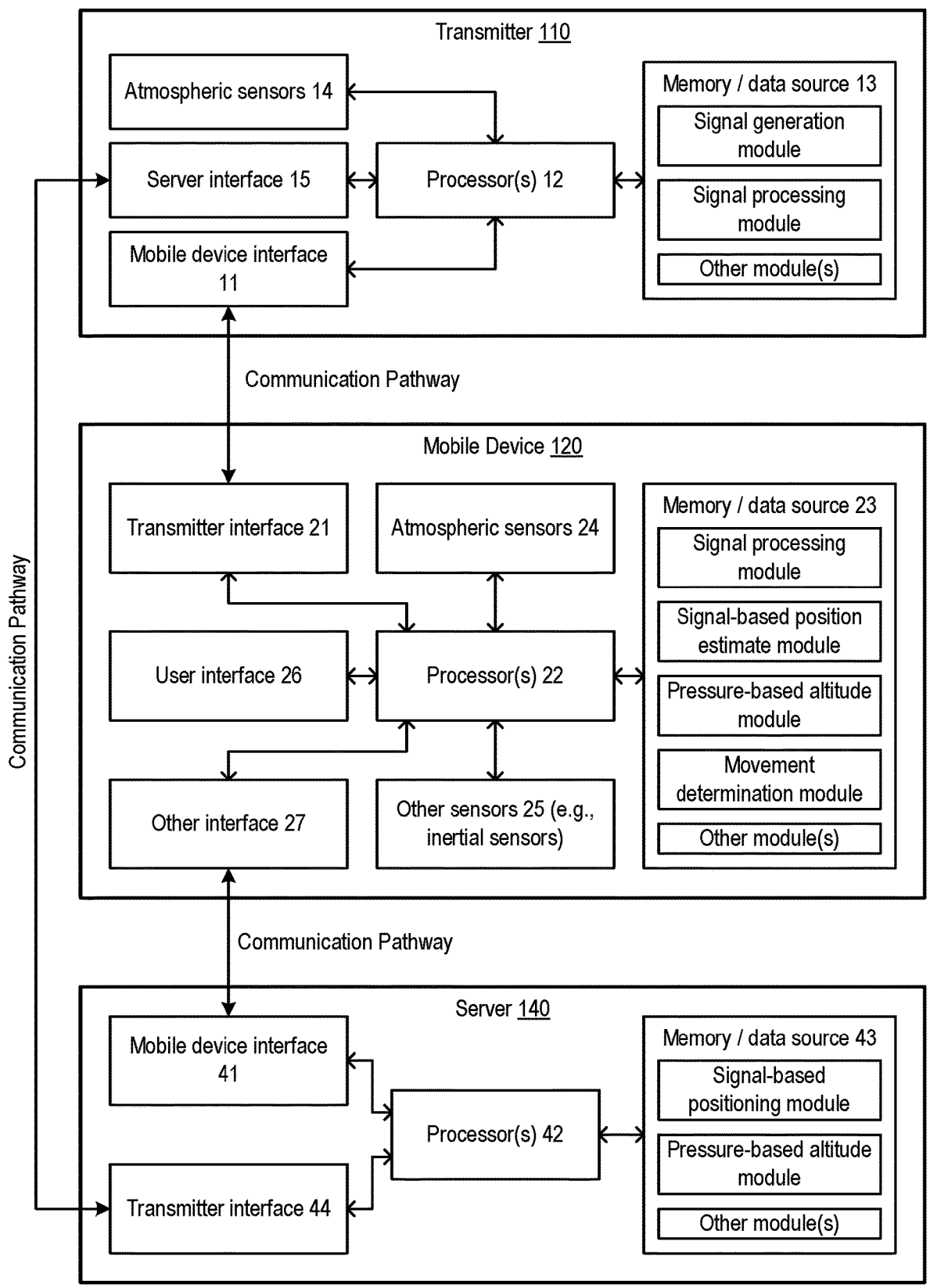
FIG. 10 illustrates components of a transmitter, a mobile device, and a server.

FIG. 10 illustrates components of a transmitter, a mobile device, and a server. Examples of communication pathways are shown by arrows between components.

By way of example in FIG. 10, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 10, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 10, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to positioning modules that estimate the positions of mobile devices—e.g., where the position is represented in terms of: latitude, longitude, and/or altitude coordinates; x, y, and/or z coordinates; angular coordinates; or other representations. Positioning modules use various techniques to estimate the position of a mobile device, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Patent Application Publication No. US 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

This application relates to the following related application(s): U.S. Pat. Appl. No. 62/680,797, filed 5 Jun. 2018, entitled SYSTEMS AND METHODS FOR DETERMINING WHERE TO PLACE ATMOSPHERIC SENSORS USED TO ESTIMATE AN ALTITUDE OF A MOBILE DEVICE IN AN ENVIRONMENT. The content of each of the related application(s) is hereby incorporated by reference herein in its entirety.

The invention claimed is:

1. A method for determining where to place atmospheric sensors that provide measurements of pressure used to estimate an altitude of a mobile device in an environment, the method comprising:
    determining a reference-level pressure for each point in a grid of uniformly-distributed points in an environment, wherein each pair of adjacent points in the grid are separated by a predefined distance;
    identifying a sub-grid of uniformly-distributed points in the grid, wherein (i) each point in the sub-grid is at least the predefined distance from each edge point in the grid, and (ii) each pair of adjacent points in the grid are separated by the predefined distance;
    identifying a first group of points in the sub-grid, wherein the points in the first group are uniformly distributed by a first distance equal to a first multiple of the predefined distance;
    for each point in the first group of points, determining a pressure value for that point using one or more reference-level pressures of points that are the first distance from that point;
    for each point in the first group of points, determining a pressure difference between the reference-level pressure for that point and the pressure value for that point;
    determining if the largest difference from the determined pressure differences is greater than a threshold amount of pressure;
    if the largest difference is greater than the threshold amount of pressure, setting the maximum distance for separating two adjacent atmospheric sensors to the first distance; and
    if the largest difference is not greater than the threshold amount of pressure, setting the maximum distance to another distance that is larger than the first distance.

2. The method of claim 1, wherein setting the maximum distance to another distance that is larger than an nth distance comprises:
    determining if the number of groups of points that have been identified is less than a threshold number; and
    if the number of the groups is not less than the threshold number, the maximum distance for separating two adjacent atmospheric sensors is set to a distance that is greater than the first distance.

3. The method of claim 2, wherein the distance that is greater than the first distance equals a length of a smallest side of the sub-grid.

4. The method of claim 2, wherein the distance that is greater than the first distance is a second distance equal to a second multiple of the predefined distance.

5. The method of claim 2, wherein if the number of the groups is less than the threshold number, the method further comprises:
    identifying a second group of points in the sub-grid, wherein the points in the second group are uniformly distributed by a second distance equal to a second multiple of the predefined distance;
    for each point in the second group of points, determining a pressure value for that point using one or more reference-level pressures of points that are the second distance from that point;
    for each point in the second group of points, determining a pressure difference between the reference-level pressure for that point and the pressure value for that point;
    determining if the largest difference from the determined pressure differences is greater than the threshold amount of pressure;
    if the largest difference is greater than the threshold amount of pressure, setting the maximum distance for separating two adjacent atmospheric sensors to the second distance; and
    if the largest difference is not greater than the threshold amount of pressure, setting the maximum distance to another distance that is larger than the second distance.

6. The method of claim 2, wherein the threshold number is determined by:
    computing a first number that is equal to half a number of edge points on the shortest side of the grid minus one;
    if the first number is not a whole number, rounding down the first number to the nearest integer to produce a second number and setting the threshold number to the second number; and
    if the first number is not a whole number, setting the threshold number to the first number.

7. The method of claim 1, wherein determining a pressure value for that point using one or more reference-level pressures of points that are the first distance from that point comprises:
    determining an average of reference-level pressures for any combination of two, three or four points that are the first distance from the point; and
    setting the pressure value to the determined average.

8. The method of claim 1, wherein determining a pressure value for that point using one or more reference-level pressures of points that are the first distance from that point comprises:
    computing the pressure value using bilinear interpolation of all reference-level pressures for all points that are separated from the point by the first distance.

9. The method of claim 1, wherein determining a pressure value for that point using one or more reference-level pressures of points that are the first distance from that point comprises:
    setting the pressure value as any reference-level pressure of any point that is the first distance from the point.

10. The method of claim 1, wherein determining a pressure value for that point using one or more reference-level pressures of points that are the first distance from that point comprises:
    setting the pressure value as a first reference-level pressure of a point located the first distance from the point that differs most from a reference-level pressure of the point as compared to other reference-level pressures of points that are located the first distance from the point.

11. One or more non-transitory machine-readable media embodying program instructions that, when executed by one or more machines, cause the one or more machines to implement the method of claim 1.

12. A system for determining where to place atmospheric sensors that provide measurements of pressure used to estimate an altitude of a mobile device in an environment, the system comprising one or more machines configured to perform the method of claim 1.

* * * * *